(12) United States Patent
He

(10) Patent No.: US 12,192,098 B2
(45) Date of Patent: Jan. 7, 2025

(54) DATA OR PACKET FORWARDING METHOD, NODE, AND SYSTEM

(71) Applicant: HUAWEI TECHNOLOGIES CO., LTD., Guangdong (CN)

(72) Inventor: Xianjun He, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 430 days.

(21) Appl. No.: 17/343,828

(22) Filed: Jun. 10, 2021

(65) Prior Publication Data

US 2021/0297344 A1 Sep. 23, 2021

Related U.S. Application Data

(63) Continuation of application No. PCT/CN2019/103317, filed on Aug. 29, 2019.

(30) Foreign Application Priority Data

Dec. 24, 2018 (CN) .......................... 201811584689.1

(51) Int. Cl.
*H04L 45/44* (2022.01)
*H04L 45/16* (2022.01)
*H04L 45/74* (2022.01)

(52) U.S. Cl.
CPC .............. *H04L 45/44* (2013.01); *H04L 45/16* (2013.01); *H04L 45/74* (2013.01)

(58) Field of Classification Search
CPC ......... H04L 45/44; H04L 45/16; H04L 45/74; H04L 61/103; H04L 45/745; H04L 49/356; H04L 2101/622; H04L 45/20
See application file for complete search history.

(56) References Cited

U.S. PATENT DOCUMENTS 7,359,394 B2 * 4/2008 Banks ................... H04L 69/166
709/227
7,562,390 B1 * 7/2009 Kwan ................. H04L 63/0236
726/23

(Continued)

FOREIGN PATENT DOCUMENTS

CN 101035087 A 9/2007
CN 101094155 A 12/2007

(Continued)

OTHER PUBLICATIONS

Extended European Search Report issued in EP19904708.5, dated Jan. 5, 2022, 11 pages.

(Continued)

*Primary Examiner* — Mandish K Randhawa

(57) ABSTRACT

The forwarding node includes a first processor, a first memory, and a network adapter. The network adapter includes a second processor, a second memory, and a transceiver. The transceiver includes a first port and a second port. The transceiver is configured to receive a broadcast packet through the first port. The second processor is configured to store a first entry in the second memory. The transceiver is configured to send the broadcast packet through the second port. The transceiver is configured to receive a response packet of the broadcast packet through the second port. The second processor is configured to query the first entry based on first address information to determine the first port. The transceiver is configured to send the response packet through the first port. The second processor is configured to store a second entry in the second memory.

17 Claims, 6 Drawing Sheets

(56) References Cited

U.S. PATENT DOCUMENTS

| | | | |
|---|---|---|---|
| 2006/0165055 | A1 | 7/2006 | Ryals et al. |
| 2007/0268915 | A1 | 11/2007 | Zelig et al. |
| 2010/0023589 | A1 | 1/2010 | Kuwasaki |
| 2012/0127996 | A1 | 5/2012 | Grosser et al. |
| 2016/0135109 | A1* | 5/2016 | Hampel ............... H04W 40/22 370/315 |
| 2016/0255539 | A1 | 9/2016 | Mizukoshi et al. |
| 2017/0134336 | A1 | 5/2017 | Chen et al. |
| 2018/0026889 | A1 | 1/2018 | Vobbilisetty et al. |
| 2018/0048666 | A1* | 2/2018 | Alderson ............... H04L 45/20 |
| 2018/0219909 | A1* | 8/2018 | Gorodissky ............ H04L 43/50 |

FOREIGN PATENT DOCUMENTS

| | | |
|---|---|---|
| CN | 201657013 U | 11/2010 |
| CN | 103259727 A | 8/2013 |
| CN | 103634210 A | 3/2014 |
| CN | 104065571 A | 9/2014 |
| CN | 104580025 A | 4/2015 |
| CN | 105959216 A | 9/2016 |
| CN | 107295020 A | 10/2017 |
| CN | 109600326 A | 4/2019 |

OTHER PUBLICATIONS

Lin Chu-jian et al., "Research and application of port isolation based on asymmetric VLAN", Journal of East China Normal University (Natural Science), No. S1,with an English abstract, Mar. 2015, total 8 pages.

B. Campbell, Ed. et al., "The Message Session Relay Protocol (MSRP)", Request for Comments: 4975, Network Working Group, Sep. 2007, total 63 pages.

Gu Zeping et al., "SDARP: software-defined address resolution proxy mechanism", Application Research of Computers, vol. 35 No. 6, Jun. 2018, with an English abstract, total 5 pages.

M. Zhang et al., "Spanning Tree Protocol (STP) Application of the Inter-Chassis Communication Protocol (ICCP)", Request for Comments: 7727, Internet Engineering Task Force (IETF), Jan. 2016, total 25 pages.

Office Action issued in CN201811584689.1, dated May 10, 2021, 5 pages.

Office Action issued in CN201811584689.1, dated Sep. 27, 2020, 8 pages.

Notice of Allowance issued in CN201811584689.1, dated Aug. 30, 2021, 4 pages.

International Search Report and Written Opinion issued in PCT/CN2019/103317, dated Oct. 28, 2019, 10 pages.

Communication pursuant to Article 94(3) issued in EP 19904708.5, dated Mar. 5, 2024, 8 pages.

* cited by examiner

Packet structure

| Destination MAC address (6 bytes) | Source MAC address (6 bytes) | TPID (2 bytes) | TCI (2 bytes) | Type (2 bytes) | Payload (46~1500 bytes) | CRC (4 bytes) |
|---|---|---|---|---|---|---|

DATA OR PACKET FORWARDING METHOD, NODE, AND SYSTEM

CROSS-REFERENCE TO RELATED APPLICATION

This application is a continuation of International Patent Application No. PCT/CN2019/103317, filed on Aug. 29, 2019, which claims priority to Chinese Patent Application No. 201811584689.1, filed on Dec. 24, 2018. The disclosures of the aforementioned applications are hereby incorporated by reference in their entireties.

TECHNICAL FIELD

This disclosure relates to the data communication field, and in particular, to a data or packet forwarding method, a node, and a system for data forwarding.

BACKGROUND

A data center usually implements functions such as centralized storage, processing, management, transmission, and exchange of data information within a physical space. For example, an e-commerce platform A establishes a data center in a site B to store, process, manage, transmit, and exchange data for transactions on the e-commerce platform A in a centralized manner. To implement the foregoing functions, the data center usually needs to include three parts: a storage node, a service node, and a networking network that connects the storage node and the service node. The storage node is configured to implement a data storage function. The service node is configured to implement data processing and management functions. The networking network is configured to implement data transmission and exchange functions.

A person skilled in the art finds, in long-term research, that how to improve performance of a networking network is an unresolved problem.

SUMMARY

This disclosure provides a data or packet forwarding method, a node, and a system, to effectively improve performance of a networking network.

According to an embodiment of a first aspect, a forwarding node is provided, and the forwarding node directly forwards a packet or data sent by another node by using a network. The forwarding node includes a first processor, a first memory, and a network adapter. The network adapter includes a second processor, a second memory, and a transceiver, and the transceiver includes a first port and a second port.

The transceiver is configured to receive a broadcast packet through the first port, the broadcast packet carries first address information of a source node, and the broadcast packet is a packet that is sent by the source node and that is used to query second address information of a destination node.

The second processor is configured to store a first entry in the second memory, and the first entry is used to record a correspondence between the first address information and the first port.

The transceiver is configured to send the broadcast packet through the second port.

The transceiver is configured to receive a response packet of the broadcast packet through the second port, the response packet carries the second address information, and the response packet is used to return the second address information to the source node.

The second processor is configured to query the first entry based on the first address information to determine the first port.

The transceiver is configured to send the response packet through the first port.

The second processor is configured to store a second entry in the second memory, and the second entry is used to record a correspondence between the second address information and the second port.

In the foregoing solution, the forwarding node implements a path self-learning function by using the second processor at a data link layer (layer 2), and does not need to make a report to the first processor at a network layer (layer 3), so that efficiency in path self-learning can be effectively improved, thereby improving network performance.

In some example embodiments, the response packet further includes the first address information.

In some example embodiments, the first address information of the source node is a media access control (MAC) address of the source node, and the second address information of the destination node is a MAC address of the destination node.

In some example embodiments, the transceiver is configured to receive a data packet, and the data packet includes data sent by the source node to the destination node and the second address information. The second processor is configured to query the second entry based on the second address information to obtain the second port. The transceiver is configured to send the data packet through the second port.

In some example embodiments, the forwarding device includes one or more of the following:

The broadcast packet further includes a first quantity of forwarding times, and the transceiver is further configured to: when determining that the first quantity of forwarding times is greater than a forwarding threshold, discard the broadcast packet; and when determining that the first quantity of forwarding times is not greater than the forwarding threshold, increase the first quantity of forwarding times by one, and send the broadcast packet through the second port;

the response packet further includes a second quantity of forwarding times. The transceiver is further configured to: when determining that the second quantity of forwarding times is greater than a forwarding threshold, discard the response packet; and when determining that the second quantity of forwarding times is not greater than the forwarding threshold, increase the second quantity of forwarding times by one, and send the response packet through the first port; or the data packet further includes a third quantity of forwarding times, and the transceiver is further configured to: when determining that the third quantity of forwarding times is greater than a forwarding threshold, discard the data packet; and when determining that the third quantity of forwarding times is not greater than the forwarding threshold, increase the third quantity of forwarding times by one, and send the data packet through the second port.

In the foregoing solution, in a process of performing self-learning, the forwarding node determines whether a quantity of forwarding times of one or more of the broadcast packet, the response packet, and the data packet is greater than the forwarding threshold, discards a corresponding packet when the quantity is greater than the forwarding threshold, and forwards the corresponding packet only when the quantity is not greater than the forwarding threshold, thereby avoiding network resource consumption caused by non-stop circulation of the corresponding packet in the network.

In some example embodiments, the transceiver is further configured to: when the response packet is attacked by a virus, determine that the second quantity of forwarding times is greater than the forwarding threshold; and discard the response packet when determining that the second quantity of forwarding times is greater than the forwarding threshold; and when determining that the second quantity of forwarding times is not greater than the forwarding threshold, increase the second quantity of forwarding times by one, and send the response packet through the first port.

In some example embodiments, the transceiver is further configured to: when the data packet is attacked by a virus, determine that the third quantity of forwarding times is greater than the forwarding threshold; and discard the data packet when determining that the third quantity of forwarding times is greater than the forwarding threshold; and when determining that the third quantity of forwarding times is not greater than the forwarding threshold, increase the third quantity of forwarding times by one, and send the data packet through the second port.

In some example embodiments, the forwarding threshold is determined based on a topology structure of a network in which the forwarding node is located. For example, the forwarding threshold is greater than a maximum forwarding hop count between nodes in the network in which the forwarding node is located, where the maximum forwarding hop count is a forwarding hop count with a maximum value in forwarding hop counts between any two nodes in the network in which the forwarding node is located.

In some example embodiments, the first quantity of forwarding times is carried in a virtual local area network field of the broadcast packet when the broadcast packet includes the first quantity of forwarding times.

The second quantity of forwarding times is carried in a virtual local area network field of the response packet when the response packet includes the second quantity of forwarding times.

The third quantity of forwarding times is carried in a virtual local area network field of the data packet when the data packet includes the third quantity of forwarding times.

In some example embodiments, the forwarding node is configured to receive the broadcast packet by using a first node, and send the broadcast packet to a second node; the first node includes a third processor and a third memory, and the second node includes a fourth processor and a fourth memory; and the third memory and the fourth memory are configured to store data forwarded or sent by using the forwarding node.

In some example embodiments, the forwarding node is further configured to: receive data by using the first node or the second node, and store the received data in the first memory. None of the forwarding node, the first node, and the second node are switches. The network in which the forwarding node is located does not need to forward data and a packet by using a switch.

In some example embodiments, the first node is the source node, and the second node is the destination node.

According to an embodiment of a second aspect, a forwarding method is provided and is applied to a forwarding node, the forwarding node directly forwards a packet or data sent by another node by using a network, the forwarding node includes a first processor, a first memory, and a network adapter, the network adapter includes a second processor, a second memory, and a transceiver, and the transceiver includes a first port and a second port;

The transceiver receives a broadcast packet through the first port, the broadcast packet carries first address information of a source node, and the broadcast packet is a packet that is sent by the source node and that is used to query second address information of a destination node.

The second processor stores a first entry in the second memory, and the first entry is used to record a correspondence between the first address information and the first port.

The transceiver sends the broadcast packet through the second port.

The transceiver receives a response packet of the broadcast packet through the second port, the response packet carries the second address information, and the response packet is used to return the second address information to the source node;

The second processor queries the first entry based on the first address information to determine the first port.

The transceiver sends the response packet through the first port.

The second processor stores a second entry in the second memory, and the second entry is used to record a correspondence between the second address information and the second port. In some example embodiments, the response packet further includes the first address information.

In some example embodiments, the first address information of the source node is a MAC address of the source node, and the second address information of the destination node is a MAC address of the destination node.

In some example embodiments, the method further includes:

The transceiver receives a data packet, where the data packet includes data sent by the source node to the destination node and the second address information; the second processor queries the second entry based on the second address information to obtain the second port; and the transceiver sends the data packet through the second port.

In some example embodiments, the method further includes one or more of the following:

The broadcast packet further includes a first quantity of forwarding times, and that the transceiver sends the broadcast packet through the second port includes: when determining that the first quantity of forwarding times is greater than a forwarding threshold, the transceiver discards the broadcast packet; and when determining that the first quantity of forwarding times is not greater than the forwarding threshold, the transceiver increases the first quantity of forwarding times by one, and sends the broadcast packet through the second port;

the response packet further includes a second quantity of forwarding times, and that the transceiver sends the response packet through the first port includes: when determining that the second quantity of forwarding times is greater than a forwarding threshold, the transceiver discards the response packet; and when determining that the second quantity of forwarding times is not greater than the forwarding threshold, the transceiver increases the second quantity of forwarding times by one, and sends the response packet through the first port; or the data packet further includes a third quantity of forwarding times; and that the transceiver sends the data packet through the second port includes: when determining that the third quantity of forwarding times is greater than a forwarding threshold, the transceiver discards the data packet; and when determining that the third quantity of forwarding times is not greater than the forwarding threshold, the transceiver increases the third quantity of forwarding times by one, and sends the data packet through the second port.

In some example embodiments, the transceiver is further configured to: when the response packet is attacked by a virus, determine that the second quantity of forwarding times is greater than the forwarding threshold; when determining that the second quantity of forwarding times is greater than the forwarding threshold, discard the response packet; and when determining that the second quantity of forwarding times is not greater than the forwarding threshold, increase the second quantity of forwarding times by one, and send the response packet through the first port.

In some example embodiments, the transceiver is further configured to: when the data packet is attacked by a virus, determine that the third quantity of forwarding times is greater than the forwarding threshold; when determining that the third quantity of forwarding times is greater than the forwarding threshold, discard the data packet; and when determining that the third quantity of forwarding times is not greater than the forwarding threshold, increase the third quantity of forwarding times by one, and send the data packet through the second port.

In some example embodiments, the forwarding threshold is determined based on a network structure of a network in which the forwarding node is located. For example, the forwarding threshold is greater than a maximum forwarding hop count between nodes in the network in which the forwarding node is located, where the maximum forwarding hop count is a forwarding hop count with a maximum value in forwarding hop counts between any two nodes in the network in which the forwarding node is located.

In some example embodiments, the first quantity of forwarding times is carried in a virtual local area network field of the broadcast packet when the broadcast packet includes the first quantity of forwarding times;

the second quantity of forwarding times is carried in a virtual local area network field of the response packet when the response packet includes the second quantity of forwarding times; and the third quantity of forwarding times is carried in a virtual local area network field of the data packet when the data packet includes the third quantity of forwarding times.

In some example embodiments, that the forwarding node directly forwards a packet or data sent by another node by using a network includes:

The forwarding node receives the broadcast packet by using a first node, and sends the broadcast packet to a second node, where the first node includes a third processor and a third memory, and the second node includes a fourth processor and a fourth memory; and the third memory and the fourth memory are configured to store data forwarded or sent by using the forwarding node.

In some example embodiments, the forwarding node is further configured to: receive data by using the first node or the second node, and store the received data in the first memory. None of the forwarding node, the first node, and the second node are switches. The network in which the forwarding node is located does not need to forward data and a packet by using a switch.

In some example embodiments, the first node is the source node, and the second node is the destination node.

According to an embodiment of a third aspect, a forwarding node is provided, including a receiving module, a first processing module, a second processing module, a sending module, and a storage module. The receiving module includes a first port, and the sending module includes a second port.

The receiving module is configured to receive a broadcast packet through the first port, the broadcast packet carries first address information of a source node, and the broadcast packet is a packet sent by the source node to query second address information of a destination node.

The second processing module is configured to store a first entry in the storage module, and the first entry is used to record a correspondence between the first address information and the first port.

The sending module is configured to send the broadcast packet through the second port.

The receiving module is configured to receive a response packet of the broadcast packet through the second port, the response packet carries the second address information, and the response packet is used to return the second address information to the source node.

The second processing module is configured to query the first entry based on the first address information to determine the first port.

The sending module is configured to send the response packet through the first port.

The second processing module is configured to store a second entry in the storage module, and the second entry is used to record a correspondence between the second address information and the second port.

In some example embodiments, the response packet further includes the first address information.

In some example embodiments, the first address information of the source node is a MAC address of the source node, and the second address information of the destination node is a MAC address of the destination node.

In some example embodiments, the receiving module is configured to receive a data packet, and the data packet includes data sent by the source node to the destination node and the second address information; the second processing module is configured to query the second entry based on the second address information to obtain the second port; and the sending module is configured to send the data packet through the second port.

In some example embodiments, the forwarding device includes one or more of the following:

The broadcast packet further includes a first quantity of forwarding times, and the sending module is further configured to: when determining that the first quantity of forwarding times is greater than a forwarding threshold, discard the broadcast packet; and when determining that the first quantity of forwarding times is not greater than the forwarding threshold, increase the first quantity of forwarding times by one, and send the broadcast packet through the second port;

the response packet further includes a second quantity of forwarding times, and the sending module is further configured to: when determining that the second quantity of forwarding times is greater than a forwarding threshold, discard the response packet; and when determining that the second quantity of forwarding times is not greater than the forwarding threshold, increase the second quantity of forwarding times by one, and send the response packet through the first port; or the data packet further includes a third quantity of forwarding times, and the sending module is further configured to: when determining that the third quantity of forwarding times is greater than a forwarding threshold, discard the data packet; and when determining that the third quantity of forwarding times is not greater than the forwarding threshold, increase the third quantity of forwarding times by one, and send the data packet through the second port.

In some example embodiments, the sending module is further configured to: when the response packet is attacked by a virus, determine that the second quantity of forwarding times is greater than the forwarding threshold; when determining that the second quantity of forwarding times is greater than the forwarding threshold, discard the response packet; and when determining that the second quantity of forwarding times is not greater than the forwarding threshold, increase the second quantity of forwarding times by one, and send the response packet through the first port.

In some example embodiments, the sending module is further configured to: when the data packet is attacked by a virus, determine that the third quantity of forwarding times is greater than the forwarding threshold; when determining that the third quantity of forwarding times is greater than the forwarding threshold, discard the data packet; and when determining that the third quantity of forwarding times is not greater than the forwarding threshold, increase the third quantity of forwarding times by one, and send the data packet through the second port.

In some example embodiments, the forwarding threshold is determined based on a topology structure of a network in which the forwarding node is located. For example, the forwarding threshold is greater than a maximum forwarding hop count between nodes in the network in which the forwarding node is located, where the maximum forwarding hop count is a forwarding hop count with a maximum value in forwarding hop counts between any two nodes in the network in which the forwarding node is located.

In some example embodiments, the first quantity of forwarding times is carried in a virtual local area network field of the broadcast packet when the broadcast packet includes the first quantity of forwarding times.

The second quantity of forwarding times is carried in a virtual local area network field of the response packet when the response packet includes the second quantity of forwarding times.

The third quantity of forwarding times is carried in a virtual local area network field of the data packet when the data packet includes the third quantity of forwarding times.

According to an embodiment of a fourth aspect, an information processing system is provided, including a plurality of forwarding nodes, where each of the forwarding nodes is the forwarding node according to any one of the example embodiments of the first aspect.

According to an embodiment of a fifth aspect, a computer non-transitory storage medium is provided, including a computer readable instruction, where when the computer readable instruction runs on a computer device, the computer device is enabled to perform the method according to any one of the example embodiments example embodiments of the second aspect.

BRIEF DESCRIPTION OF DRAWINGS

To describe the technical solutions in embodiments of this disclosure or in the background more clearly, the following briefly describes the accompanying drawings for describing the embodiments of this disclosure or the background.

DESCRIPTION OF EMBODIMENTS

Figure 1:
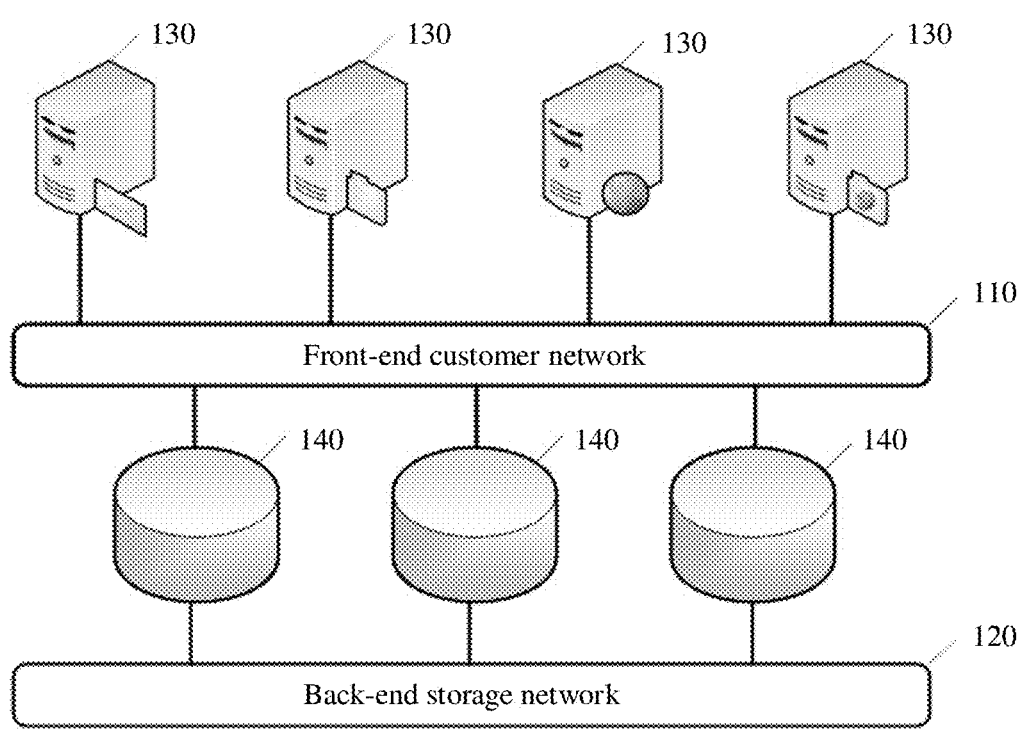
FIG. 1 is a schematic diagram of networking of a data center according to an embodiment of this disclosure.

As shown in FIG. 1, a networking network of a data center may include two parts: a front-end customer network 110 and a back-end storage network 120. The front-end customer network 110 is a network for interconnection between a service node 130 and a storage node 140, and is configured to implement data communication between the service node 130 and the storage node 140. The back-end storage network 120 is a network for interconnection between storage nodes 140, and is configured to implement data communication between the storage nodes 140.

The storage node 140 may receive an electronic file (or a "file") from the service node 130 by using the front-end customer network 110, and store the file. The file includes but is not limited to a data form such as a text, an image, audio content, video content, or a combination thereof. A protocol used when the storage node 140 receives the file may be a network file system protocol or another protocol. The storage node 140 may store data such as a service log generated during a normal operation. The storage node 140 may create data based on other data (for example, by generating a small thumbnail image from a high-resolution source image) and store the data. In addition, a storage engine may be further integrated into the storage node 140, and the storage engine is configured to determine how file content is distributed on a plurality of storage nodes.

Figure 2:
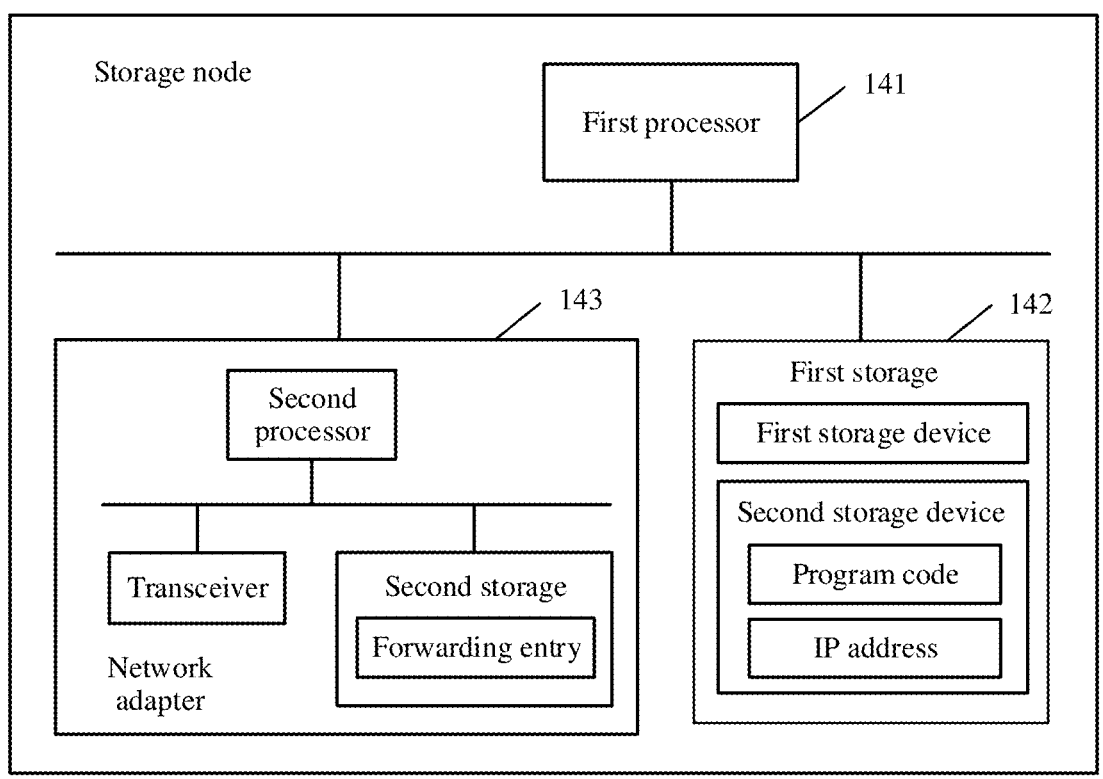
FIG. 2 is a schematic structural diagram of a storage node according to an embodiment of this disclosure.

As shown in FIG. 2, the storage node 140 usually includes a first processor 141, a first storage 142 (e.g., a first memory), and a network adapter 143.

The first processor 141 may be one or more general-purpose processors. The general-purpose processor may be any type of device capable of processing one or more electronic instructions, including a central processing unit (CPU), a microprocessor, a microcontroller, a main processor, a controller, an application specific integrated circuit (ASIC), and the like. The first processor 141 executes various types of digital storage instructions, for example, software or firmware programs stored in the first memory 142. In an example embodiment, the first processor 141 may be an x86 processor or the like. The first processor 141 sends a command to the first memory 142 through a physical interface, to complete a storage-related task. For example, commands that may be provided by the first processor 141 include a read command, a write command, a copy command, an erase command, and the like. The command may specify an operation related to a specific page and block of the first memory 142. As an example, a command may request to write data to a specific physical page, or another command may request to erase a specific physical block.

The first memory 142 may include a first storage device and a second storage device. The first storage device may be, for example, a random access memory (RAM), a flash memory, or the like. The second storage device may be a RAM, a read-only memory (ROM), a hard disk (HDD), or a solid-state drive (SSD). The first storage device has a faster data access speed than the second storage device, but the second storage device usually has a larger storage capacity than the first storage device.

The network adapter 143 is also referred to as a network interface controller, a network interface card, or a local area network (LAN) adapter. Each network adapter 143 has a unique MAC address, which is burnt into a read-only memory chip by a manufacturer of the network adapter 143 during production. The storage node 140 is connected to a network by using the network adapter 143.

The network adapter 143 includes a second processor, a second storage (e.g., a second memory), and a transceiver. The second processor is similar to the first processor, but a performance requirement of the second processor may be lower than a performance requirement of the first processor. In an example embodiment, the second processor may be an ARM processor or the like. The second memory may also be a flash memory, an HDD, or an SDD, and a storage capacity of the second memory may be smaller than a storage capacity of the first memory. The transceiver may be configured to: receive and send a packet, and upload the received packet to the second processor for processing. The network adapter 143 may further include a plurality of ports, and the port may be any one or more of three types of interfaces: a thick-cable interface, a thin-cable interface, and a twisted pair interface.

An example implementation of the back-end storage network between the storage nodes 140 may include switch networking and switch-free networking.

Figure 3:
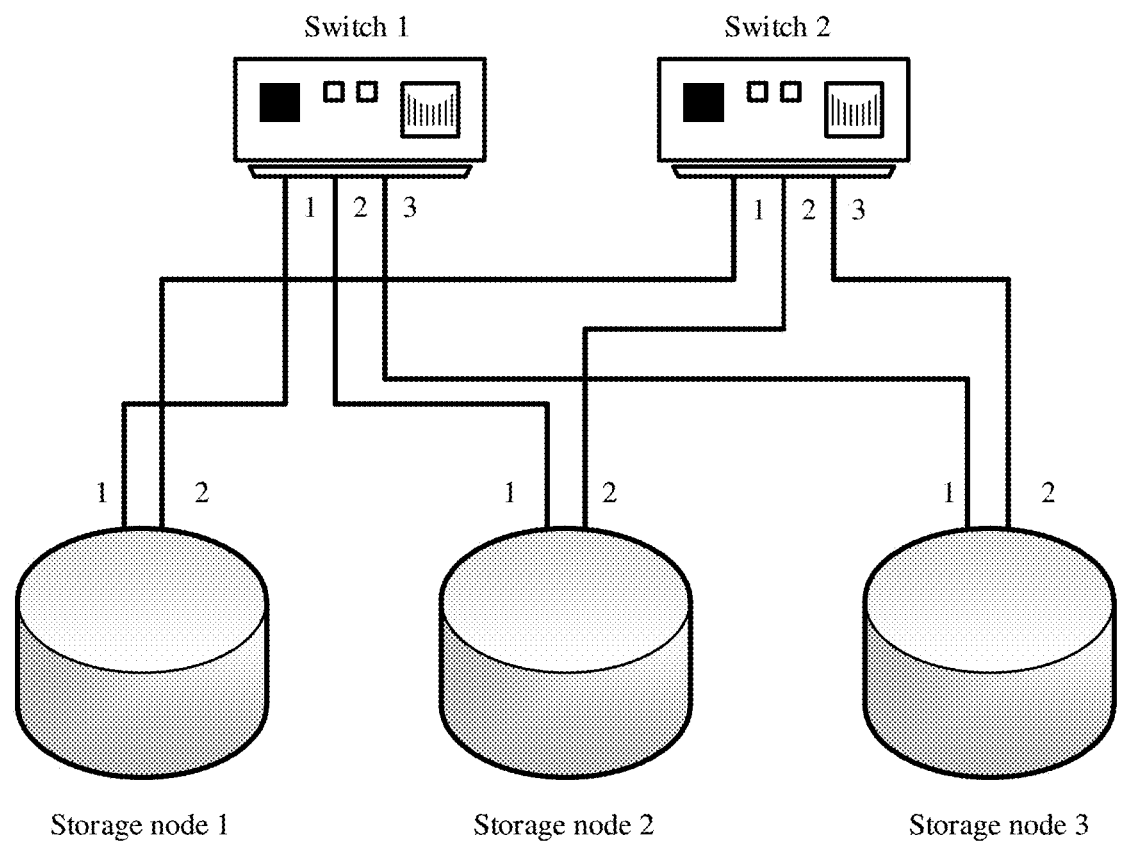
FIG. 3 is a schematic structural diagram of switch networking according to an embodiment of this disclosure.

As shown in FIG. 3, an example implementation of the switch networking may be as follows: A port 1 of a storage node 1 is connected to a port 1 of a switch 1, a port 1 of a storage node 2 is connected to a port 2 of the switch, and a port 1 of a storage node 3 is connected to a port 3 of the switch 1. A port 2 of the storage node 1 is connected to a port 1 of a switch 2, a port 2 of the storage node 2 is connected to a port 2 of the switch, and a port 2 of the storage node 3 is connected to a port 3 of the switch 2. In other words, different ports of the switch 1 are respectively connected to one port of the storage node 1, that of the storage node 2, and that of the storage node 3, and different ports of the switch 2 are respectively connected to the other port of the storage node 1, that of the storage node 2, and that of the storage node 3. The switch networking shown in FIG. 3 is merely an example, and should not constitute a specific limitation.

A feature of the switch networking is that data communication between storage nodes needs to pass through a switch (which may also be referred to as a bridge), and the switch implements data communication between different storage nodes. As shown in FIG. 3, when the storage node 1 needs to perform data communication with the storage node 2, the storage node 1 may transmit data to the storage node 2 by using the switch 1. When the storage node 2 needs to perform data communication with the storage node 3, the storage node 2 may transmit data to the storage node 3 by using the switch 1. When the storage node 1 needs to perform data communication with the storage node 3, the storage node 1 may transmit data to the storage node 3 by using the switch 1. To ensure reliability of data transmission, a redundant backup switch (that is, the switch 2) of the switch 1 is further disposed in a switch networking manner shown in FIG. 3, to ensure that when the switch 1 is faulty, the switch 2 can take over from the switch 1 for working.

Figure 4:
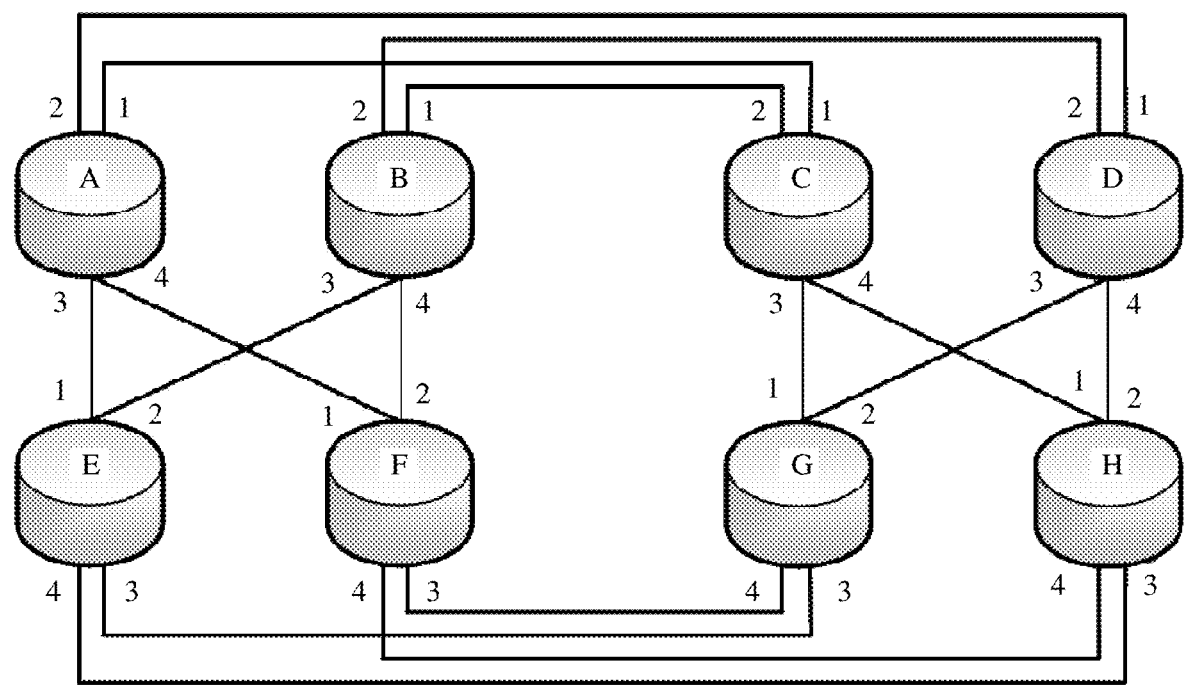
FIG. 4 is a schematic structural diagram of switch-free networking according to an embodiment of this disclosure.

As shown in FIG. 4, an example implementation of the switch-free networking may be as follows: A port 1 of a storage node A is connected to a port 1 of a storage node C, a port 2 of the storage node A is connected to a port 1 of a storage node D, a port 3 of the storage node A is connected to a port 1 of a storage node E, a port 4 of the storage node A is connected to a port 1 of a storage node F, a port 1 of a storage node B is connected to a port 2 of the storage node C, a port 2 of the storage node B is connected to a port 2 of the storage node D, a port 3 of the storage node B is connected to a port 2 of the storage node E, a port 4 of the storage node B is connected to a port 2 of the storage node F, a port 3 of the storage node C is connected to a port 1 of a storage node G, a port 4 of the storage node C is connected to a port 1 of a storage node H, a port 3 of the storage node D is connected to a port 2 of the storage node G, a port 4 of the storage node D is connected to a port 2 of the storage node H, a port 3 of the storage node E is connected to a port 3 of the storage node G, a port 4 of the storage node E is connected to a port 3 of the storage node H, a port 3 of the storage node F is connected to a port 4 of the storage node G, and a port 4 of the storage node F is connected to a port 4 of the storage node H. The switch-free networking shown in FIG. 4 is merely an example, and should not constitute a specific limitation.

A networking feature of the switch-free networking is that data communication between storage nodes does not need to pass through a switch, and the storage nodes perform data communication with each other by using a topology network. As shown in FIG. 4, when the storage node A needs to perform data communication with the storage node F, the storage node A may directly transmit data to the storage node F. When the storage node A needs to transmit data to the storage node G, the storage node A may transmit the data to the storage node D, and then the storage node D transmits the data to the storage node G. When the storage node A needs to perform data communication with the storage node H, the storage node A may transmit data to the storage node C, and then the storage node C transmits the data to the storage node H. To ensure reliability of data transmission, the topology network in a switch-free networking manner shown in FIG. 4 needs to ensure that at least two data paths exist between any two storage nodes, to ensure that when one of the data paths is faulty, data can still be transmitted through another path. For example, at least two data paths exist between the storage node A and the storage node F: a data path of the storage node A→the storage node F, and a data path of the storage node A→the storage node D→the storage node G→the storage node F. At least two data paths exist between the storage node A and the storage node G: a data path of the storage node A→the storage node D→the storage node G, and a data path of the storage node A→the storage node F→the storage node G. At least two data paths exist between the storage node A and the storage node H: a data path of the storage node A→the storage node C→the storage node H, and a data path of the storage node A→the storage node F→the storage node H. It can be understood that a link between other storage nodes, for example, a link from the storage node B to the storage node C, a link from the storage node B to the storage node D, a link from the storage node B to the storage node E, or a link from the storage node B to the storage node F, may be deduced by analogy.

Compared with the switch networking, the switch-free networking may not require a switch for networking, to effectively reduce costs required for the networking, and is applicable to an enterprise-class data center. However, the switching-free networking manner has a problem that forwarding entry configuration is complex and a traffic loop problem. This greatly affects performance of the back-end storage network.

To facilitate understanding, the following further describes the problem that forwarding entry configuration is complex and the traffic loop problem existing in the switching-free networking manner.

1. Problem that forwarding entry configuration is complex.

In FIG. 4, for example, the storage node A (a source node) sends data to the storage node H (a destination node) via steps including:

(1) Preconfigure a first forwarding entry for the storage node A, where the first forwarding entry is sending, from the port 2 of the storage node A, a data packet in which a destination MAC address is a MAC address of the storage node H.

(2) Preconfigure a second forwarding entry for the storage node D, where the second forwarding entry is sending, from the port 4 of the storage node D, the data packet in which the destination MAC address is the MAC address of the storage node H.

(3) The storage node A generates a first data packet, and sends the first data packet based on the first forwarding entry through the port 2 of the storage node A, where a destination MAC address carried in the first data packet is the MAC address of the storage node H.

(4) The storage node D receives, through the port 1 of the storage node D, the first data packet sent by the storage node A, determines, based on the destination MAC address carried in the first data packet, that the storage node D is not the destination node, and sends the first data packet based on the second forwarding entry through the port 4 of the storage node D.

(5) The storage node H receives, through the port 2 of the storage node H, the first data packet sent by the storage node D, and determines, based on the destination MAC address in the first data packet, that the storage node H is the destination node.

It can be understood that the switch-free networking includes a plurality of storage nodes, and it needs to ensure that data transmission between every two storage nodes needs to be ensured. Therefore, a plurality of forwarding entries need to be configured for each storage node, and a huge workload is caused if the forwarding entries are manually configured.

2. Traffic loop problem.

Figure 5:
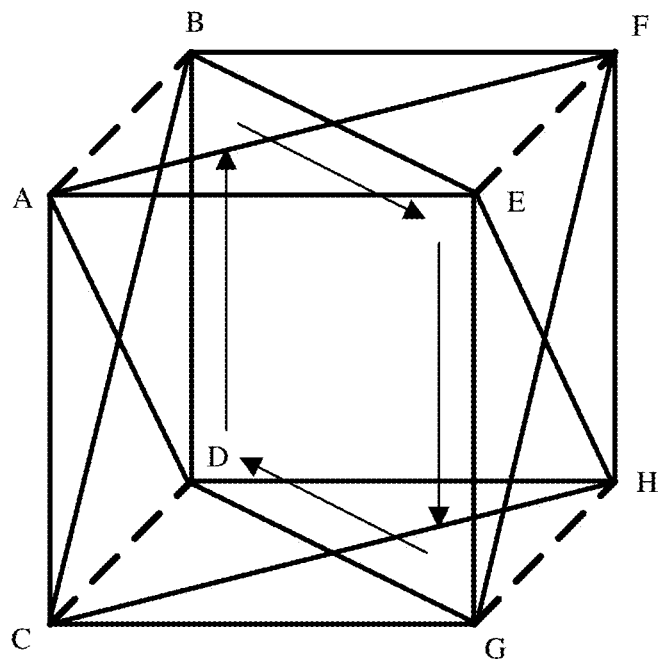
FIG. 5 is a logical networking diagram of switch-free networking shown in FIG. 4.

A topology diagram of the switch-free networking shown in FIG. 4 may be represented as a logical networking diagram of switch-free networking shown in FIG. 5. To convert the topology diagram shown in FIG. 4 to the logical networking diagram shown in FIG. 5, such a principle needs to be followed: When a direct connection relationship exists between storage nodes in FIG. 4, a relationship between corresponding storage nodes in FIG. 5 is represented by using a solid line connection. A correspondence between the topology diagram of the switch-free networking in FIG. 4 and the logical networking diagram in FIG. 5 is as follows:

A direct connection relationship exists between the storage node A and the storage node C in FIG. 4, and may be correspondingly represented as an edge between a storage node A and a storage node C on a left side of a cube in FIG. 5.

A direct connection relationship exists between the storage node A and the storage node D in FIG. 4, and may be correspondingly represented as a diagonal between the storage node A and a storage node D on the left side of the cube in FIG. 5.

A direct connection relationship exists between the storage node A and the storage node E in FIG. 4, and may be correspondingly represented as an edge between the storage node A and a storage node E on a top side of the cube in FIG. 5.

A direct connection relationship exists between the storage node A and the storage node F in FIG. 4, and may be correspondingly represented as a diagonal between the storage node A and a storage node F on the top side of the cube in FIG. 5.

A direct connection relationship exists between the storage node B and the storage node C in FIG. 4, and may be correspondingly represented as a diagonal between a storage node B and the storage node C on the left side of the cube in FIG. 5.

A direct connection relationship exists between the storage node B and the storage node D in FIG. 4, and may be correspondingly represented as an edge between the storage node B and the storage node D on the left side of the cube in FIG. 5.

A direct connection relationship exists between the storage node B and the storage node E in FIG. 4, and may be correspondingly represented as a diagonal between the storage node B and the storage node E on the top side of the cube in FIG. 5.

A direct connection relationship exists between the storage node B and the storage node F in FIG. 4, and may be correspondingly represented as an edge between the storage node B and the storage node F on the top side of the cube in FIG. 5.

A direct connection relationship exists between the storage node C and the storage node G in FIG. 4, and may be correspondingly represented as an edge between the storage node C and a storage node G on a front side of the cube in FIG. 5.

A direct connection relationship exists between the storage node C and the storage node H in FIG. 4, and may be correspondingly represented as a diagonal between the storage node C and a storage node H on a bottom side of the cube in FIG. 5.

A direct connection relationship exists between the storage node D and the storage node G in FIG. 4, and may be correspondingly represented as a diagonal between the storage node D and the storage node G on the bottom side of the cube in FIG. 5.

A direct connection relationship exists between the storage node D and the storage node H in FIG. 4, and may be correspondingly represented as an edge between the storage node D and the storage node H on a back side of the cube in FIG. 5.

A direct connection relationship exists between the storage node E and the storage node G in FIG. 4, and may be correspondingly represented as an edge between the storage node E and the storage node G on the front side of the cube in FIG. 5.

A direct connection relationship exists between the storage node E and the storage node H in FIG. 4, and may be correspondingly represented as a diagonal between the storage node E and the storage node H on a right side of the cube in FIG. 5.

A direct connection relationship exists between the storage node F and the storage node G in FIG. 4, and may be correspondingly represented as a diagonal between the storage node F and the storage node G on the right side of the cube in FIG. 5.

A direct connection relationship exists between the storage node F and the storage node H in FIG. 4, and may be correspondingly represented as an edge between the storage node F and the storage node H on the back side of the cube in FIG. 5.

It can be understood that although the storage node A and the storage node B, the storage node C and the storage node D, the storage node E and the storage node F, and the storage node G and the storage node H in FIG. 5 are all connected by using dashed lines, actually, no direct connection relationship exists between the storage node A and the storage node B, between the storage node C and the storage node D, between the storage node E and the storage node F, and between the storage node G and the storage node H.

It can be seen from the logical networking diagram shown in FIG. 5 that a traffic loop may form among the storage node B, the storage node E, the storage node G, and the storage node D. For example, it is assumed that when the storage node A sends a broadcast packet in the switch-free networking to search for a MAC address of the storage node H, if the storage node D sends the broadcast packet of the storage node A to the storage node B after receiving the broadcast packet, if the storage node B sends the broadcast packet of the storage node D to the storage node E (as shown by an arrow in FIG. 5) after receiving the broadcast packet, after receiving the broadcast packet forwarded by the storage node B, the storage node E sends the broadcast packet to the storage node G; after receiving the broadcast packet forwarded by the storage node E, the storage node G sends the broadcast packet to the storage node D; after receiving the broadcast packet forwarded by the storage node G, the storage node D sends the broadcast packet to the storage node B; after receiving the broadcast packet forwarded by the storage node D, the storage node B sends the broadcast packet to the storage node E again; and so on. Therefore, the broadcast packet endlessly circulates in the traffic loop, a large number of resources of the switch-free networking are occupied, and consequently, performance of the switch-free networking is greatly affected. It should be understood that the foregoing traffic loop is merely an example. In actual application, another traffic loop may also occur. For example, a traffic loop may also occur among the storage node A, the storage node F, the storage node H, and the storage node G. This is not specifically limited in embodiments of the present disclosure.

To resolve the foregoing problem that forwarding entry configuration is complex, in the switch-free networking in this disclosure, a path self-learning mechanism is implemented in the network adapter, so that complexity of manually configuring a forwarding entry can be effectively reduced, to improve the performance of the switch-free networking.

For example, the storage node A (a source node) shown in FIG. 4 sends a data packet to the storage node H (a destination node), and the path self-learning mechanism may be specifically implemented in such a manner:

First phase: a phase in which the source node sends a broadcast packet to the destination node.

A first processor in the storage node A generates a broadcast packet, and sends the broadcast packet to a second processor in the storage node A. The second processor in the storage node A indicates a transceiver in the storage node A to send the broadcast packet through a specified port (for example, the port 2) of the storage node A, where the broadcast packet carries a source internet protocol (IP) address (an IP address of the storage node A), a source MAC address (a MAC address of the storage node A), and a destination IP address (an IP address of the storage node H). The IP address of the storage node H may be an IP address entered by a receiving user voluntarily, or the like. This is not specifically limited in embodiments of the present disclosure.

A transceiver of the storage node D receives, through the port 1 of the storage node D, the broadcast packet sent by the storage node A, and sends the broadcast packet to a second processor of the storage node D. The second processor of the storage node D is configured to process a MAC address at a data link layer, and a first processor of the storage node D is configured to process an IP address at a network layer. Therefore, the second processor of the storage node D sends the broadcast packet to the first processor of the storage node D when the second processor of the storage node D finds no destination MAC address in the broadcast packet. The first processor of the storage node D obtains the destination IP address (the IP address of the storage node H) from the broadcast packet, compares the destination IP address (the IP address of the storage node H) with an IP address of the storage node D to determine that the storage node D is not the destination node, and sends a comparison result to the second processor of the storage node D. The second processor of the storage node D then associates the source MAC address (the MAC address of the storage node A) with the port 1 of the storage node D as an entry and stores the entry in a second memory of the storage node D, and the transceiver of the storage node D sends the broadcast packet to all other ports of the storage node D than the port 1 of the storage node D.

A transceiver of the storage node H receives, through the port 2 of the storage node H, the broadcast packet sent by the storage node D, and sends the broadcast packet to a second processor of the storage node H. The second processor of the storage node H is configured to process a MAC address at the data link layer, and a first processor of the storage node H is configured to process an IP address at the network layer. Therefore, the second processor of the storage node H sends the broadcast packet to the first processor of the storage node H when the second processor of the storage node H finds no destination MAC address in the broadcast packet. The first processor of the storage node H obtains the destination IP address (the IP address of the storage node H) from the broadcast packet, and determines that the storage node H is the destination node. The first processor of the storage node H stores an association relationship between the source MAC address (the MAC address of the storage node A) and the source IP address (the IP address of the storage node A) in a first memory of the storage node H.

It can be understood that, in a process in which the storage node A sends the broadcast packet to the storage node H, the storage node A and the storage node H are respectively a source node and a target node, and a correspondence between a source MAC address and a port does not need to be separately stored as an entry in a second memory of the storage node A and that of the storage node H; and the storage node D is an intermediate forwarding node, and the correspondence between the source MAC address and the port needs to be stored as an entry in the second memory of the storage node D.

Second phase: a phase in which the destination node returns a response packet to the source node.

When the storage node H needs to return a response packet to the storage node A, the first processor of the storage node H queries the first memory to obtain the IP address of the storage node A and the MAC address of the storage node A, generates a response packet of the broadcast packet, and sends the response packet to the second processor of the storage node H, where the response packet includes a destination MAC address (the MAC address of the storage node A) and a source MAC address (a MAC address of the storage node H).

The second processor of the storage node H indicates, based on a preconfigured routing configuration policy, the second processor of the storage node H to send the response packet through the port 2 of the transceiver of the storage node H.

The transceiver of the storage node D receives, through the port 4 of the storage node D, the response packet sent by the storage node H, and sends the response packet to the second processor of the storage node D. The second processor of the storage node D is configured to process the MAC address at the data link layer, and the first processor of the storage node D is configured to process the IP address at the network layer. Therefore, when the second processor of the storage node D finds the destination MAC address in the response packet, the second processor of the storage node D obtains the destination MAC address (the MAC address of the storage node A) from the response packet, and compares the destination MAC address (the MAC address of the storage node A) with a MAC address of the storage node D to determine that the response packet needs to be forwarded. The second processor of the storage node D then finds the entry from the second memory of the storage node D to determine a correspondence between the destination MAC address (the MAC address of the storage node A) and the port 1 of the storage node D, and the transceiver of the storage node D sends the response packet based on the foregoing correspondence through the port 1 of the storage node D. The second processor of the storage node D stores a correspondence between the source MAC address (the MAC address of the storage node H) and the port 4 of the storage node D as an entry in the second memory of the storage node D.

The transceiver of the storage node A receives, through the port 2 of the storage node A, the response packet sent by the storage node D, and sends the response packet to the second processor of the storage node A. The second processor of the storage node A is configured to process a MAC address at the data link layer, and the first processor of the storage node A is configured to process an IP address at the network layer. Therefore, when the second processor of the storage node A finds the destination MAC address in the response packet, the second processor of the storage node A obtains the destination MAC address (the MAC address of the storage node A) from the response packet, and compares the destination MAC address with the MAC address of the storage node A to determine that the response packet does not need to be forwarded anymore. Therefore, the second processor of the storage node A reports the response packet to the first processor of the storage node A; and the first processor of the storage node A obtains the source MAC address (the MAC address of the storage node H) from the response packet, and stores a correspondence between the source MAC address (the MAC address of the storage node H) and the IP address of the storage node H as an entry in a first memory of the storage node A.

It can be understood that, in a process in which the storage node H returns the response packet to the storage node A, the storage node H and the storage node A are respectively a source node and a target node, and a correspondence between a destination MAC address and a port does not need to be separately stored as an entry in the second memory of the storage node H and that of the storage node A; and the storage node D is an intermediate forwarding node, and the correspondence between the destination MAC address and the port needs to be stored as an entry in the second memory of the storage node D.

Third phase: a phase in which the source node sends a data packet to the destination node.

When the storage node A needs to send a data packet to the storage node H, the first processor of the storage node A queries the first memory to obtain a destination IP address (the IP address of the storage node H) and a destination MAC address (the MAC address of the storage node H), and generates a data packet, where the data packet carries the destination MAC address (the MAC address of the storage node H).

The first processor of the storage node A indicates, based on a preconfigured routing configuration policy, the second processor of the storage node A to send the data packet from the port 2 of the transceiver of the storage node A.

The transceiver of the storage node D receives, through the port 1 of the storage node D, the data packet sent by the storage node A, and sends the data packet to the second processor of the storage node D. The second processor of the storage node D is configured to process the MAC address at the data link layer, and the first processor of the storage node D is configured to process the IP address at the network layer. Therefore, when the second processor of the storage node D obtains, through querying, the destination MAC address (the MAC address of the storage node H) from the data packet, the second processor of the storage node D obtains the destination MAC address (the MAC address of the storage node H) from the data packet, and compares the destination MAC address (the MAC address of the storage node H) with the MAC address of the storage node D to determine that the storage node D is not the destination node. Therefore, the second processor of the storage node D finds the entry from the second memory of the storage node D to determine a correspondence between the destination MAC address (the MAC address of the storage node H) and the port 4 of the storage node D. The transceiver of the storage node D sends the data packet through the port 4 of the storage node D.

The transceiver of the storage node H receives, through the port 2 of the storage node H, the data packet sent by the storage node D, and sends the data packet to the second processor of the storage node H. The second processor of the storage node H is configured to process the MAC address at the data link layer, and the first processor of the storage node H is configured to process the IP address at the network layer. Therefore, when the second processor of the storage node H obtains, through querying, the destination MAC address (the MAC address of the storage node H) from the data packet, the second processor of the storage node H determines, based on the destination MAC address (the MAC address of the storage node H) carried in the data packet, that the storage node H is the destination node, and reports the data packet to the first processor of the storage node H.

In the first phase, in the process in which the storage node A sends the broadcast packet to the storage node H, the storage node D learns how to return the response packet of the broadcast packet to the storage node A. In the second phase, in the process in which the storage node H returns the response packet to the storage node A, the storage node D learns how to send the data packet to the storage node H. After the foregoing two learning processes, the storage node A may send the data packet to the storage node H via the storage node D in the third phase.

To resolve the foregoing problem that a traffic loop occurs in the switch-free networking, in the switch-free networking in this disclosure, a traffic loop avoidance mechanism is combined on the basis of the path self-learning mechanism, so that formation of the traffic loop can be effectively avoided, to improve the performance of the switch-free networking.

According to cases of combining the traffic loop avoidance mechanism in different phases of the path self-learning mechanism, combining the traffic loop avoidance mechanism on the basis of the path self-learning mechanism may include at least three different implementations:

In a first manner, the traffic loop avoidance mechanism is combined in a first phase (a phase in which a source node sends a broadcast packet to a destination node).

In FIG. 4, for example, the source node is the storage node A, the destination node is the storage node H, and a forwarding threshold is 2. Combining the traffic loop avoidance mechanism in a process in which the source node sends the broadcast packet to the destination node may be implemented in the following manner:

First phase: a phase in which the source node sends a broadcast packet to the destination node.

A first processor in the storage node A generates a broadcast packet, and sends the broadcast packet to a second processor in the storage node A. The second processor in the storage node A indicates a transceiver in the storage node A to send the broadcast packet through a specified port (for example, the port 2) of the storage node A, where the broadcast packet carries a source IP address (an IP address of the storage node A), a source MAC address (a MAC address of the storage node A), a destination IP address (an IP address of the storage node H), and a quantity of forwarding times, and an initial value of the quantity of forwarding times is 0. The IP address of the storage node H may be entered by a user voluntarily. This is not specifically limited in embodiments of the present disclosure. In addition, the broadcast packet may further carry a broadcast identifier, and the broadcast identifier is used to represent whether it needs to determine whether the quantity of forwarding times of the broadcast packet needs to be greater than the forwarding threshold. For example, when the broadcast identifier is 1, it needs to determine whether the quantity of forwarding times of the broadcast packet needs to be greater than the forwarding threshold; or when the broadcast identifier is 0, it does not need to determine whether the quantity of forwarding times of the broadcast packet needs to be greater than the forwarding threshold.

A transceiver of the storage node D receives, through the port 1 of the storage node D, the broadcast packet sent by the storage node A, and sends the broadcast packet to a second processor of the storage node D. When the second processor of the storage node D determines that the broadcast identifier in the broadcast packet is 1, the second processor of the storage node D modifies the quantity of forwarding times carried in the broadcast packet to 1. The second processor of the storage node D is configured to process a MAC address at a data link layer, and a first processor of the storage node D is configured to process an IP address at a network layer. Therefore, the second processor of the storage node D sends the broadcast packet to the first processor of the storage node D when the second processor of the storage node D finds no destination MAC address (a MAC address of the storage node H) in the broadcast packet. The first processor of the storage node D obtains the destination IP address (the IP address of the storage node H) from the broadcast packet, compares the destination IP address (the IP address of the storage node H) with an IP address of the storage node D to determine that the storage node D is not the destination node, and sends a determining result to the second processor of the storage node D. The second processor of the storage node D then determines that the quantity of forwarding times is not greater than the forwarding threshold 2. Therefore, the second processor of the storage node D associates the source MAC address (the MAC address of the storage node A) with the port 1 of the storage node D as an entry and stores the entry in a second memory of the storage node D. The transceiver of the storage node D sends the broadcast packet through all other ports of the storage node D than the port 1 of the storage node D.

A transceiver of the storage node H receives, through the port 2 of the storage node H, the broadcast packet sent by the storage node D, and sends the broadcast packet to a second processor of the storage node H. When the second processor of the storage node H determines that the broadcast identifier in the broadcast packet is 1, the second processor of the storage node H modifies the quantity of forwarding times carried in the broadcast packet to 2. The second processor of the storage node H is configured to process a MAC address at the data link layer, and a first processor of the storage node H is configured to process an IP address at the network layer. Therefore, the second processor of the storage node H sends the broadcast packet to the first processor of the storage node H when the second processor of the storage node H finds no destination MAC address (the MAC address of the storage node H) in the broadcast packet. The first processor of the storage node H obtains the destination IP address (the IP address of the storage node H) from the broadcast packet, and determines, based on the destination IP address (the IP address of the storage node H), that the storage node H is the destination node. Therefore, the storage node H stores a correspondence between the source MAC address (the MAC address of the storage node A) and the source IP address (the IP address of the storage node A) as an entry in a first memory.

Second phase: a phase in which the destination node returns a response packet to the source node.

When the storage node H needs to return a response packet to the storage node A, the first processor of the storage node H queries the first memory to obtain a destination IP address (the IP address of the storage node A) and a destination MAC address (the MAC address of the storage node A), generates a response packet of the broadcast packet, and sends the response packet to the second processor of the storage node H, where the response packet includes the destination MAC address (the MAC address of the storage node A) and a source MAC address (the MAC address of the storage node H). In addition, the response packet may further carry a response identifier, and the response identifier is used to represent whether it needs to determine whether a quantity of forwarding times of the response packet needs to be greater than the forwarding threshold. For example, when the response identifier is 1, it needs to determine whether the quantity of forwarding times of the response packet needs to be greater than the forwarding threshold; or when the response identifier is 0, it does not need to determine whether the quantity of forwarding times of the response packet needs to be greater than the forwarding threshold.

The second processor of the storage node H indicates, based on a preconfigured routing configuration policy, the second processor of the storage node H to send the response packet through the port 2 of the transceiver of the storage node H.

The transceiver of the storage node D receives, through the port 4 of the storage node D, the response packet sent by the storage node H, and sends the response packet to the second processor of the storage node D. When the second processor of the storage node D determines that the response identifier in the response packet is 0, the second processor of the storage node D is configured to process the MAC address at the data link layer, and the first processor of the storage node D is configured to process the IP address at the network layer. Therefore, when the second processor of the storage node D finds the destination MAC address (the MAC address of the storage node A) in the response packet, the second processor may process the destination MAC address at the data link layer. The second processor of the storage node D obtains the destination MAC address (the MAC address of the storage node A) from the response packet, and compares the destination MAC address (the MAC address of the storage node A) with a MAC address of the storage node D to determine that the response packet needs to be forwarded. The second processor of the storage node D then finds the entry from the second memory of the storage node D to determine a correspondence between the destination MAC address (the MAC address of the storage node A) and the port 1 of the storage node D, and the second processor of the storage node D sends the response packet based on the foregoing correspondence by using the transceiver and the port 1 of the storage node D. The second processor of the storage node D stores a correspondence between the source MAC address (the MAC address of the storage node H) and the port 4 of the storage node D as an entry in the second memory of the storage node D.

The transceiver of the storage node A receives, through the port 2 of the storage node A, the response packet sent by the storage node D, and sends the response packet to the second processor of the storage node A. When the second processor of the storage node A determines that the response identifier in the response packet is 0, the second processor of the storage node A is configured to process a MAC address at the data link layer, and the first processor of the storage node A is configured to process an IP address at the network layer. Therefore, when the second processor of the storage node A finds the destination MAC address (the MAC address of the storage node A) in the response packet, the second processor of the storage node A obtains the destination MAC address (the MAC address of the storage node A) from the response packet, and determines, based on the destination MAC address (the MAC address of the storage node A), that the response packet does not need to be forwarded anymore. Therefore, the second processor of the storage node A reports the response packet to the first processor of the storage node A; and the first processor of the storage node A obtains the MAC address of the storage node H from the response packet, and stores a correspondence between the MAC address of the storage node H and the IP address of the storage node H as an entry in a first memory of the storage node A.

Third phase: a phase in which the source node sends a data packet to the destination node.

When the storage node A needs to send a data packet to the storage node H, the first processor of the storage node A queries a destination IP address (the IP address of the storage node H) and a destination MAC address (the MAC address of the storage node H), and generates a data packet, where the data packet carries the destination MAC address (the MAC address of the storage node H). In addition, the data packet may further carry a data identifier, and the data identifier is used to represent whether it needs to determine whether a quantity of forwarding times of the data packet needs to be greater than the forwarding threshold. For example, when the data identifier is 1, it needs to determine whether the quantity of forwarding times of the data packet needs to be greater than the forwarding threshold; or when the data identifier is 0, it does not need to determine whether the quantity of forwarding times of the data packet needs to be greater than the forwarding threshold.

The first processor of the storage node A indicates, based on a preconfigured routing configuration policy, the second processor of the storage node A to send the data packet from the port 2 of the transceiver of the storage node A.

The transceiver of the storage node D receives, through the port 1 of the storage node D, the data packet sent by the storage node A, and sends the data packet to the second processor of the storage node D. When the second processor of the storage node D determines that the data identifier in the data packet is 0, the second processor of the storage node D is configured to process the MAC address at the data link layer, and the first processor of the storage node D is configured to process the IP address at the network layer. Therefore, when the second processor of the storage node D obtains, through querying, the destination MAC address (the MAC address of the storage node H) from the data packet, when the second processor of the storage node D finds the destination MAC address (the MAC address of the storage node H) in the data packet, the second processor of the storage node D obtains the destination MAC address (the MAC address of the storage node H) from the data packet, and compares the destination MAC address (the MAC address of the storage node H) with the MAC address of the storage node D to determine that the storage node D is not the destination node. Therefore, the second processor of the storage node D finds the entry from the second memory of the storage node D to determine a correspondence between the destination MAC address (the MAC address of the storage node H) and the port 4 of the storage node D. The transceiver of the storage node D sends the data packet through the port 4 of the storage node D.

The transceiver of the storage node H receives, through the port 2 of the storage node H, the data packet sent by the storage node D, and sends the data packet to the second processor of the storage node H. When the second processor of the storage node H determines that the data identifier in the data packet is 0, the second processor of the storage node H is configured to process the MAC address at the data link layer, and the first processor of the storage node H is configured to process the IP address at the network layer. Therefore, when the second processor of the storage node H obtains, through querying, the destination MAC address (the MAC address of the storage node H) from the data packet, when the second processor of the storage node H finds the destination MAC address (the MAC address of the storage node H) in the data packet, the second processor of the storage node H determines, based on the destination MAC address (the MAC address of the storage node H) carried in the data packet, that the storage node H is the destination node, and reports the data packet to the first processor of the storage node H.

In this embodiment, when the storage node detects that the broadcast identifier carried in the broadcast packet is 1 (in this embodiment, the response identifier carried in the response packet is 0 and the data identifier carried in the data packet is 0), the storage node determines, in the first phase, whether the quantity of forwarding times of the broadcast packet is greater than the forwarding threshold, and sends the broadcast packet to a next storage node when the quantity is not greater than the forwarding threshold.

In a second manner, the traffic loop avoidance mechanism is combined in a second phase (a phase in which a destination node sends a response packet to a source node).

In FIG. 4, for example, the source node is the storage node A, the destination node is the storage node H, and a forwarding threshold is 2. Combining the traffic loop avoidance mechanism in a process in which the destination node sends the response packet to the source node may be implemented in such a manner:

First phase: a phase in which the source node sends a broadcast packet to the destination node.

A first processor in the storage node A generates a broadcast packet, and sends the broadcast packet to a second processor in the storage node A. The second processor in the storage node A indicates a transceiver in the storage node A to send the broadcast packet through a specified port (for example, the port 2) of the storage node A, where the broadcast packet carries a source MAC address (a MAC address of the storage node A) and a destination IP address (an IP address of the storage node H). The IP address of the storage node H may be entered by a user voluntarily. This is not specifically limited in embodiments of the present disclosure.

A transceiver of the storage node D receives, through the port 1 of the storage node D, the broadcast packet sent by the storage node A, and sends the broadcast packet to a second processor of the storage node D. When the second processor of the storage node D determines that a broadcast identifier in the broadcast packet is 0, the second processor of the storage node D is configured to process a MAC address at a data link layer, and a first processor of the storage node D is configured to process an IP address at a network layer. Therefore, the second processor of the storage node D sends the broadcast packet to the first processor of the storage node D when the second processor of the storage node D finds no destination MAC address (a MAC address of the storage node H) in the broadcast packet. The first processor of the storage node D obtains the destination IP address (the IP address of the storage node H) from the broadcast packet, compares the destination IP address (the IP address of the storage node H) with an IP address of the storage node D to determine that the storage node D is not the destination node, and sends a comparison result to the second processor of the storage node D. The second processor of the storage node D then associates the source MAC address (the MAC address of the storage node A) with the port 1 of the storage node D as an entry and stores the entry in a second memory of the storage node D, and the transceiver of the storage node D sends the broadcast packet to all other ports of the storage node D than the port 1 of the storage node D.

A transceiver of the storage node H receives, through the port 2 of the storage node H, the broadcast packet sent by the storage node D, and sends the broadcast packet to a second processor of the storage node H. When the second processor of the storage node H determines that the broadcast identifier in the broadcast packet is 0, the second processor of the storage node H is configured to process a MAC address at the data link layer, and a first processor of the storage node H is configured to process an IP address at the network layer. Therefore, the second processor of the storage node H sends the broadcast packet to the first processor of the storage node H when the second processor of the storage node H finds no destination MAC address (the MAC address of the storage node H) in the broadcast packet. The first processor of the storage node H obtains the destination IP address (the IP address of the storage node H) from the broadcast packet, and determines, based on the destination IP address (the IP address of the storage node H), that the storage node H is the destination node. The storage node H then stores a correspondence relationship between the source MAC address (the MAC address of the storage node A) and a source IP address (an IP address of the storage node A) in a first memory.

It can be understood that, in a process in which the storage node A sends the broadcast packet to the storage node H, the storage node A and the storage node H are respectively a source node and a target node, and a correspondence between a source MAC address and a port does not need to be separately stored as an entry in a second memory of the storage node A and that of the storage node H; and the storage node D is an intermediate forwarding node, and the correspondence between the source MAC address and the port needs to be stored as an entry in the second memory of the storage node D.

Second phase: a phase in which the destination node returns a response packet to the source node.

When the storage node H needs to return a response packet to the storage node A, the first processor of the storage node H queries the first memory to obtain the IP address of the storage node A and the MAC address of the storage node A, generates a response packet of the broadcast packet, and sends the response packet to the second processor of the storage node H, where the response packet includes a destination MAC address (the MAC address of the storage node A), a source MAC address (the MAC address of the storage node H), and a quantity of forwarding times, and an initial value of the quantity of forwarding times is 0.

The second processor of the storage node H indicates, based on a preconfigured routing configuration policy, the second processor of the storage node H to send the response packet through the port 2 of the transceiver of the storage node H.

The transceiver of the storage node D receives, through the port 4 of the storage node D, the response packet sent by the storage node H, and sends the response packet to the second processor of the storage node D. When the second processor of the storage node D determines that a response identifier in the response packet is 1, the second processor of the storage node D sets the quantity of forwarding times in the response packet to 1. The second processor of the storage node D is configured to process the MAC address at the data link layer, and the first processor of the storage node D is configured to process the IP address at the network layer. Therefore, when the second processor of the storage node D finds the destination MAC address (the MAC address of the storage node A) in the response packet, the second processor of the storage node D obtains the destination MAC address (the MAC address of the storage node A) from the response packet, and compares the destination MAC address (the MAC address of the storage node A) with a MAC address of the storage node D to determine that the response packet needs to be forwarded. The second processor of the storage node D then determines that the quantity of forwarding times is not greater than the forwarding threshold. Therefore, the second processor of the storage node D finds the entry from the second memory of the storage node D to determine a correspondence between the destination MAC address (the MAC address of the storage node A) and the port 1 of the storage node D, and the second processor of the storage node D sends the response packet based on the foregoing correspondence by using the transceiver and the port 1 of the storage node D. The second processor of the storage node D stores a correspondence between the source MAC address (the MAC address of the storage node H) and the port 4 of the storage node D as an entry in the second memory of the storage node D.

The transceiver of the storage node A receives, through the port 2 of the storage node A, the response packet sent by the storage node D, and sends the response packet to the second processor of the storage node A. When the second processor of the storage node A determines that the response identifier in the response packet is 1, the second processor of the storage node A sets the quantity of forwarding times in the response packet to 2. The second processor of the storage node A is configured to process a MAC address at the data link layer, and the first processor of the storage node A is configured to process an IP address at the network layer. Therefore, when the second processor of the storage node A finds the destination MAC address (the MAC address of the storage node A) in the response packet, the second processor of the storage node A obtains the destination MAC address (the MAC address of the storage node A) from the response packet, and determines, based on the destination MAC address (the MAC address of the storage node A), that the response packet does not need to be forwarded anymore. Therefore, the second processor of the storage node A reports the response packet to the first processor of the storage node A, the first processor of the storage node A determines that the quantity of forwarding times is not greater than the forwarding threshold, and the first processor of the storage node A obtains the source MAC address (the MAC address of the storage node H) from the response packet, and stores a correspondence between the source MAC address (the MAC address of the storage node H) and the IP address of the storage node H as an entry in a first memory of the storage node A.

It can be understood that, in a process in which the storage node H returns the response packet to the storage node A, the storage node H and the storage node A are respectively a source node and a target node, and a correspondence between a destination MAC address and a port does not need to be separately stored as an entry in the second memory of the storage node H and that of the storage node A; and the storage node D is an intermediate forwarding node, and the correspondence between the destination MAC address and the port needs to be stored as an entry in the second memory of the storage node D.

Third phase: a phase in which the source node sends a data packet to the destination node.

When the storage node A needs to send a data packet to the storage node H, the first processor of the storage node A queries the first memory to obtain a destination IP address (the IP address of the storage node H) and a destination MAC address (the MAC address of the storage node H), and generates a data packet, where the data packet carries the destination MAC address (the MAC address of the storage node H).

The first processor of the storage node A indicates, based on a preconfigured routing configuration policy, the second processor of the storage node A to send the data packet from the port 2 of the transceiver of the storage node A.

The transceiver of the storage node D receives, through the port 1 of the storage node D, the data packet sent by the storage node A, and sends the data packet to the second processor of the storage node D. When the second processor of the storage node D determines that a data identifier in the data packet is 0, the second processor of the storage node D is configured to process the MAC address at the data link layer, and the first processor of the storage node D is configured to process the IP address at the network layer. Therefore, when the second processor of the storage node D finds the destination MAC address (the MAC address of the storage node H) in the data packet, the second processor of the storage node D obtains the destination MAC address (the MAC address of the storage node H) from the data packet, and compares the destination MAC address (the MAC address of the storage node H) with the MAC address of the storage node D to determine that the storage node D is not the destination node. Therefore, the second processor of the storage node D finds the entry from the second memory of the storage node D to determine a correspondence between the destination MAC address (the MAC address of the storage node H) and the port 4 of the storage node D. The transceiver of the storage node D sends the data packet through the port 4 of the storage node D.

The transceiver of the storage node H receives, through the port 2 of the storage node H, the data packet sent by the storage node D, and sends the data packet to the second processor of the storage node H. When the second processor of the storage node H determines that the data identifier in the data packet is 0, the second processor of the storage node H is configured to process the MAC address at the data link layer, and the first processor of the storage node H is configured to process the IP address at the network layer. Therefore, when the second processor of the storage node H finds the destination MAC address (the MAC address of the storage node H) in the data packet, the second processor of the storage node H determines, based on the destination MAC address (the MAC address of the storage node H) carried in the data packet, that the storage node H is the destination node, and reports the data packet to the first processor of the storage node H.

In this embodiment, when the storage node detects that the response identifier carried in the response packet is 1 (in this embodiment, the broadcast identifier carried in the broadcast packet is 0 and the data identifier carried in the data packet is 0), the storage node determines, in the second phase, whether the quantity of forwarding times of the response packet is greater than the forwarding threshold, and sends the response packet to a next storage node when the quantity is not greater than the forwarding threshold.

In a third manner, the traffic loop avoidance mechanism is combined in a third phase (a phase in which a source node sends a data packet to a destination node).

In FIG. 4, for example, the source node is the storage node A, the destination node is the storage node H, and a forwarding threshold is 2. In this case, a source MAC address (that is, a MAC address of the storage node A) corresponds to first address information in the claims, a destination MAC address (that is, a MAC address of the storage node H) corresponds to second address information in the claims, and combining the traffic loop avoidance mechanism in the phase in which the source node sends the data packet to the destination node may be implemented in the following manner:

First phase: a phase in which the source node sends a broadcast packet to the destination node.

A first processor in the storage node A generates a broadcast packet, and sends the broadcast packet to a second processor in the storage node A. The second processor in the storage node A indicates a transceiver in the storage node A to send the broadcast packet through a specified port (for example, the port 2) of the storage node A, where the broadcast packet carries a source IP address (an IP address of the storage node A), a source MAC address (the MAC address of the storage node A), and a destination IP address (an IP address of the storage node H). The IP address of the storage node H may be entered by a user voluntarily. This is not specifically limited in embodiments of the present disclosure.

A transceiver of the storage node D receives, through the port 1 of the storage node D, the broadcast packet sent by the storage node A, and sends the broadcast packet to a second processor of the storage node D. When the second processor of the storage node D determines that a broadcast identifier in the broadcast packet is 0, the second processor of the storage node D is configured to process a MAC address at a data link layer, and a first processor of the storage node D is configured to process an IP address at a network layer. Therefore, the second processor of the storage node D sends the broadcast packet to the first processor of the storage node D when the second processor of the storage node D finds no destination MAC address (the MAC address of the storage node H) in the broadcast packet. The first processor of the storage node D obtains the destination IP address (the IP address of the storage node H) from the broadcast packet, compares the destination IP address (the IP address of the storage node H) with an IP address of the storage node D to determine that the storage node D is not the destination node, and sends a comparison result to the second processor of the storage node D. The second processor of the storage node D then associates the source MAC address (the MAC address of the storage node A) with the port 1 of the storage node D as an entry and stores the entry in a second memory of the storage node D, and the transceiver of the storage node D sends the broadcast packet to all other ports of the storage node D than the port 1 of the storage node D.

A transceiver of the storage node H receives, through the port 2 of the storage node H, the broadcast packet sent by the storage node D, and sends the broadcast packet to a second processor of the storage node H. When the second processor of the storage node H determines that the broadcast identifier in the broadcast packet is 0, the second processor of the storage node H is configured to process a MAC address at the data link layer, and a first processor of the storage node H is configured to process an IP address at the network layer. Therefore, the second processor of the storage node H sends the broadcast packet to the first processor of the storage node H when the second processor of the storage node H finds no destination MAC address (the MAC address of the storage node H) in the broadcast packet. The first processor of the storage node H obtains the destination IP address (the IP address of the storage node H) from the broadcast packet, and determines, based on the destination IP address (the IP address of the storage node H), that the storage node H is the destination node. The first processor of the storage node H then associates the source MAC address (the MAC address of the storage node A) with the IP address of the storage node A as an entry and stores the entry in a second memory of the storage node H.

It can be understood that, in a process in which the storage node A sends the broadcast packet to the storage node H, the storage node A and the storage node H are respectively a source node and a target node, and a correspondence between a source MAC address and a port does not need to be separately stored as an entry in a second memory of the storage node A and that of the storage node H; and the storage node D is an intermediate forwarding node, and the correspondence between the source MAC address and the port needs to be stored as an entry in the second memory of the storage node D.

Second phase: a phase in which the destination node returns a response packet to the source node.

When the storage node H needs to return a response packet to the storage node A, the first processor of the storage node H queries a first memory to obtain the IP address of the storage node A and the MAC address of the storage node A, generates a response packet of the broadcast packet, and sends the response packet to the second processor of the storage node H, where the response packet includes a destination MAC address (the MAC address of the storage node A) and a source MAC address (the MAC address of the storage node H).

The second processor of the storage node H indicates, based on a preconfigured routing configuration policy, the second processor of the storage node H to send the response packet through the port 2 of the transceiver of the storage node H.

The transceiver of the storage node D receives, through the port 4 of the storage node D, the response packet sent by the storage node H, and sends the response packet to the second processor of the storage node D. When the second processor of the storage node D determines that a response identifier in the response packet is 0, the second processor of the storage node D is configured to process the MAC address at the data link layer, and the first processor of the storage node D is configured to process the IP address at the network layer. Therefore, when the second processor of the storage node D finds the destination MAC address (the MAC address of the storage node A) in the response packet, the second processor of the storage node D obtains the destination MAC address (the MAC address of the storage node A) from the response packet, and compares the destination MAC address (the MAC address of the storage node A) with a MAC address of the storage node D to determine that the response packet needs to be forwarded. The second processor of the storage node D then finds the entry from the second memory of the storage node D to determine a correspondence between the destination MAC address (the MAC address of the storage node A) and the port 1 of the storage node D, and the second processor of the storage node D sends the response packet based on the foregoing correspondence by using the transceiver and the port 1 of the storage node D. The second processor of the storage node D stores a correspondence between the source MAC address (the MAC address of the storage node H) and the port 4 of the storage node D as an entry in the second memory of the storage node D.

The transceiver of the storage node A receives, through the port 2 of the storage node A, the response packet sent by the storage node D, and sends the response packet to the second processor of the storage node A. When the second processor of the storage node A determines that the response identifier in the response packet is 0, the second processor of the storage node A is configured to process a MAC address at the data link layer, and the first processor of the storage node A is configured to process an IP address at the network layer. Therefore, when the second processor of the storage node A finds the destination MAC address (the MAC address of the storage node A) in the response packet, the second processor of the storage node A obtains the destination MAC address (the MAC address of the storage node A) from the response packet, and compares the destination MAC address (the MAC address of the storage node A) with the MAC address of the storage node A to determine that the response packet does not need to be forwarded anymore. Therefore, the second processor of the storage node A reports the response packet to the first processor of the storage node A; and the first processor of the storage node A obtains the source MAC address (the MAC address of the storage node H) from the response packet, and stores a correspondence between the source MAC address (the MAC address of the storage node H) and the IP address of the storage node H as an entry in a first memory of the storage node A.

It can be understood that, in a process in which the storage node H returns the response packet to the storage node A, the storage node H and the storage node A are respectively a source node and a target node, and a correspondence between a destination MAC address and a port does not need to be separately stored as an entry in the second memory of the storage node H and that of the storage node A; and the storage node D is an intermediate forwarding node, and the correspondence between the destination MAC address and the port needs to be stored as an entry in the second memory of the storage node D.

Third phase: a phase in which the source node sends a data packet to the destination node.

When the storage node A needs to send a data packet to the storage node H, the first processor of the storage node A queries the first memory to obtain a destination IP address (the IP address of the storage node H) and a destination MAC address (the MAC address of the storage node H), and the first processor of the storage node A queries the first memory to obtain, through querying, the destination MAC address (the MAC address of the storage node H) based on the destination IP address (the IP address of the storage node H), and generates a data packet, where the data packet carries the destination MAC address (the MAC address of the storage node H) and a quantity of forwarding times, and an initial value of the quantity of forwarding times is 0.

The first processor of the storage node A indicates, based on a preconfigured routing configuration policy, the second processor of the storage node A to send the data packet from the port 2 of the transceiver of the storage node A.

The transceiver of the storage node D receives, through the port 1 of the storage node D, the data packet sent by the storage node A, and sends the data packet to the second processor of the storage node D. When the second processor of the storage node D determines that a data identifier in the data packet is 1, the second processor of the storage node D sets the quantity of forwarding times to 1. The second processor of the storage node D is configured to process the MAC address at the data link layer, and the first processor of the storage node D is configured to process the IP address at the network layer. Therefore, when the second processor of the storage node D finds the destination MAC address (the MAC address of the storage node H) in the data packet, the second processor of the storage node D obtains the destination MAC address (the MAC address of the storage node H) from the data packet, and compares the destination MAC address (the MAC address of the storage node H) with the MAC address of the storage node D to determine that the storage node D is not the destination node. The second processor of the storage node D determines that the quantity of forwarding times is not greater than the forwarding threshold. Therefore, the second processor of the storage node D finds the entry from the second memory of the storage node D to determine a correspondence between the destination MAC address (the MAC address of the storage node H) and the port 4 of the storage node D. The transceiver of the storage node D sends the data packet through the port 4 of the storage node D.

The transceiver of the storage node H receives, through the port 2 of the storage node H, the data packet sent by the storage node D, and sends the data packet to the second processor of the storage node H. When the second processor of the storage node H determines that the data identifier in the data packet is 1, the second processor of the storage node H sets the quantity of forwarding times to 2, and determines that the quantity of forwarding times is not greater than the forwarding threshold. The second processor of the storage node H is configured to process the MAC address at the data link layer, and the first processor of the storage node H is configured to process the IP address at the network layer. Therefore, when the second processor of the storage node H finds the destination MAC address (the MAC address of the storage node H) in the data packet, the second processor of the storage node H determines, based on the destination MAC address (the MAC address of the storage node H) carried in the data packet, that the storage node H is the destination node, and reports the data packet to the first processor of the storage node H.

In this embodiment, when the storage node detects that the data identifier carried in the data packet is 1 (in this embodiment, the broadcast identifier carried in the broadcast packet is 0 and the response identifier carried in the response packet is 0), the storage node determines, in the third phase, whether the quantity of forwarding times of the data packet is greater than the forwarding threshold, and sends the data packet to a next storage node when the quantity is not greater than the forwarding threshold.

In the foregoing description, the first manner, the second manner, and the third manner are separately used as examples for description. However, in actual application, any multiple manners of the first manner, the second manner, and the third manner may be combined. For example, the first manner and the second manner may be combined, the first manner and the third manner may be combined, the second manner and the third manner may be combined, and the first manner, the second manner, and the third manner may be combined. This is not specifically limited in embodiments of the present disclosure.

The following uses a combination of the first manner, the second manner, and the third manner as an example to describe how to combine the traffic loop avoidance mechanism on the basis of the path self-learning mechanism.

In FIG. 4, for example, a source node is the storage node A, a destination node is the storage node H, and a forwarding threshold is 2. Combining the traffic loop avoidance mechanism in a process in which the source node sends a broadcast packet to the destination node may be implemented in such a manner:

First phase: a phase in which the source node sends a broadcast packet to the destination node.

A first processor in the storage node A generates a broadcast packet, and sends the broadcast packet to a second processor in the storage node A. The second processor in the storage node A indicates a transceiver in the storage node A to send the broadcast packet through a specified port (for example, the port 2) of the storage node A, where the broadcast packet carries a source IP address (an IP address of the storage node A), a source MAC address (a MAC address of the storage node A), a destination IP address (an IP address of the storage node H), and a first quantity of forwarding times, and an initial value of the first quantity of forwarding times is 0. The IP address of the storage node H may be entered by a user voluntarily. This is not specifically limited in embodiments of the present disclosure.

A transceiver of the storage node D receives, through the port 1 of the storage node D, the broadcast packet sent by the storage node A, and sends the broadcast packet to a second processor of the storage node D. The second processor of the storage node D modifies the first quantity of forwarding times carried in the broadcast packet to 1. The second processor of the storage node D is configured to process a MAC address at a data link layer, and a first processor of the storage node D is configured to process an IP address at a network layer. Therefore, the second processor of the storage node D sends the broadcast packet to the first processor of the storage node D when the second processor of the storage node D finds no destination MAC address in the broadcast packet when the second processor of the storage node D finds no destination MAC address (a MAC address of the storage node H) in the broadcast packet. The first processor of the storage node D obtains the destination IP address (the IP address of the storage node H) from the broadcast packet, compares the destination IP address (the IP address of the storage node H) with an IP address of the storage node D to determine that the storage node D is not the destination node, and sends a determining result to the second processor of the storage node D. The second processor of the storage node D then determines that the first quantity of forwarding times is not greater than the forwarding threshold 2. Therefore, the second processor of the storage node D associates the source MAC address (the MAC address of the storage node A) with the port 1 of the storage node D as an entry and stores the entry in a second memory of the storage node D. The transceiver of the storage node D sends the broadcast packet through all other ports of the storage node D than the port 1 of the storage node D.

A transceiver of the storage node H receives, through the port 2 of the storage node H, the broadcast packet sent by the storage node D, and sends the broadcast packet to a second processor of the storage node H. The second processor of the storage node H modifies the first quantity of forwarding times carried in the broadcast packet to 2, the second processor of the storage node H is configured to process a MAC address at the data link layer, and a first processor of the storage node H is configured to process an IP address at the network layer. Therefore, the second processor of the storage node H sends the broadcast packet to the first processor of the storage node H when the second processor of the storage node H finds no destination MAC address (the MAC address of the storage node H) in the broadcast packet. The first processor of the storage node H obtains the destination IP address (the IP address of the storage node H) from the broadcast packet, and determines, based on the destination IP address (the IP address of the storage node H), that the storage node H is the destination node. The first processor of the storage node H then determines that the first quantity of forwarding times is not greater than the forwarding threshold. Therefore, the storage node H stores a correspondence between the source MAC address (the MAC address of the storage node A) and the IP address of the storage node A as an entry in a first memory.

It can be understood that, in a process in which the storage node A sends the broadcast packet to the storage node H, the storage node A and the storage node H are respectively a source node and a target node, and a correspondence between a source MAC address and a port does not need to be separately stored as an entry in a second memory of the storage node A and that of the storage node H; and the storage node D is an intermediate forwarding node, and the correspondence between the source MAC address and the port needs to be stored as an entry in the second memory of the storage node D.

Second phase: a phase in which the destination node returns a response packet to the source node.

When the storage node H needs to return a response packet to the storage node A, the first processor of the storage node H queries the first memory to obtain the IP address of the storage node A and the MAC address of the storage node A, and sends the response packet to the second processor of the storage node H, where the response packet includes a destination MAC address (the MAC address of the storage node A), a source MAC address (the MAC address of the storage node H), and a second quantity of forwarding times, and an initial value of the second quantity of forwarding times is 0.

The second processor of the storage node H indicates, based on a preconfigured routing configuration policy, the second processor of the storage node H to send the response packet through the port 2 of the transceiver of the storage node H.

The transceiver of the storage node D receives, through the port 4 of the storage node D, the response packet sent by the storage node H, and sends the response packet to the second processor of the storage node D. The second processor of the storage node D sets the second quantity of forwarding times in the response packet to 1, the second processor of the storage node D is configured to process the MAC address at the data link layer, and the first processor of the storage node D is configured to process the IP address at the network layer. Therefore, when the second processor of the storage node D finds the destination MAC address (the MAC address of the storage node A) in the response packet, the second processor of the storage node D obtains the destination MAC address (the MAC address of the storage node A) from the response packet, and compares the destination MAC address (the MAC address of the storage node A) with a MAC address of the storage node D to determine that the response packet needs to be forwarded. The second processor of the storage node D then determines that the second quantity of forwarding times is not greater than the forwarding threshold. Therefore, the second processor of the storage node D finds the entry from the second memory of the storage node D to determine a correspondence between the destination MAC address (the MAC address of the storage node A) and the port 1 of the storage node D, and the second processor of the storage node D sends the response packet based on the foregoing correspondence by using the transceiver and the port 1 of the storage node D. The second processor of the storage node D stores a correspondence between the source MAC address (the MAC address of the storage node H) and the port 4 of the storage node D as an entry in the second memory of the storage node D.

The transceiver of the storage node A receives, through the port 2 of the storage node A, the response packet sent by the storage node D, and sends the response packet to the second processor of the storage node A. The second processor of the storage node A sets the second quantity of forwarding times in the response packet to 2, the second processor of the storage node A is configured to process a MAC address at the data link layer, and the first processor of the storage node A is configured to process an IP address at the network layer. Therefore, when the second processor of the storage node A finds the destination MAC address (the MAC address of the storage node A) in the response packet, the second processor of the storage node A obtains the destination MAC address (the MAC address of the storage node A) from the response packet, and determines, based on the destination MAC address (the MAC address of the storage node A), that the response packet does not need to be forwarded anymore. Therefore, the second processor of the storage node A reports the response packet to the first processor of the storage node A, the first processor of the storage node A determines that the second quantity of forwarding times is not greater than the forwarding threshold, and the first processor of the storage node A obtains the source MAC address (the MAC address of the storage node H) from the response packet, and stores a correspondence between the source MAC address (the MAC address of the storage node H) and the IP address of the storage node H as an entry in a first memory of the storage node A.

It can be understood that, in a process in which the storage node H returns the response packet to the storage node A, the storage node H and the storage node A are respectively a source node and a target node, and a correspondence between a destination MAC address and a port does not need to be separately stored as an entry in the second memory of the storage node H and that of the storage node A; and the storage node D is an intermediate forwarding node, and the correspondence between the destination MAC address and the port needs to be stored as an entry in the second memory of the storage node D.

Third phase: a phase in which the source node sends a data packet to the destination node.

When the storage node A needs to send a data packet to the storage node H, the first processor of the storage node A queries the first memory to obtain a destination IP address (the IP address of the storage node H) and a destination MAC address (the MAC address of the storage node H), and generates a data packet, where the data packet carries the destination MAC address (the MAC address of the storage node H) and a third quantity of forwarding times, and an initial value of the third quantity of forwarding times is 0.

The first processor of the storage node A indicates, based on a preconfigured routing configuration policy, the second processor of the storage node A to send the data packet from the port 2 of the transceiver of the storage node A.

The transceiver of the storage node D receives, through the port 1 of the storage node D, the data packet sent by the storage node A, and sends the data packet to the second processor of the storage node D. The second processor of the storage node D sets the third quantity of forwarding times to 1, the second processor of the storage node D is configured to process the MAC address at the data link layer, and the first processor of the storage node D is configured to process the IP address at the network layer. Therefore, when the second processor of the storage node D finds the destination MAC address (the MAC address of the storage node H) in the data packet, the second processor of the storage node D obtains the destination MAC address (the MAC address of the storage node H) from the data packet, and compares the destination MAC address (the MAC address of the storage node H) with the MAC address of the storage node D to determine that the storage node D is not the destination node. The second processor of the storage node D determines that the third quantity of forwarding times is not greater than the forwarding threshold. Therefore, the second processor of the storage node D finds the entry from the second memory of the storage node D to determine a correspondence between the destination MAC address (the MAC address of the storage node H) and the port 4 of the storage node D. The transceiver of the storage node D sends the data packet through the port 4 of the storage node D.

The transceiver of the storage node H receives, through the port 2 of the storage node H, the data packet sent by the storage node D, and sends the data packet to the second processor of the storage node H. The second processor of the storage node H sets the third quantity of forwarding times to 2, and determines that the third quantity of forwarding times is not greater than the forwarding threshold. The second processor of the storage node H is configured to process the MAC address at the data link layer, and the first processor of the storage node H is configured to process the IP address at the network layer. Therefore, when the second processor of the storage node H finds the destination MAC address (the MAC address of the storage node H) in the data packet, the second processor of the storage node H determines, based on the destination MAC address (the MAC address of the storage node H) carried in the data packet, that the storage node H is the destination node, and reports the data packet to the first processor of the storage node H.

In the foregoing embodiment, in the first phase, the second phase, and the third phase, the storage node sends the broadcast packet, the response packet, and the data packet to a next storage node only when determining that none of the first quantity of forwarding times, the second quantity of forwarding times, and the third quantity of forwarding times are greater than the forwarding threshold.

In each of the foregoing examples, description is provided by using an example in which a forwarding node determines that a quantity of forwarding times of a packet (including a broadcast packet, a response packet, and a data packet) is not greater than a forwarding threshold. In actual application, a storage node discards a packet if the storage node determines that a quantity of forwarding times of the packet is greater than a forwarding threshold.

1. A forwarding node determines that a quantity of forwarding times of a broadcast packet is greater than a forwarding threshold, and discards the broadcast packet.

First phase: a phase in which a source node sends a broadcast packet to a destination node. The foregoing example of combining the traffic loop avoidance mechanism in the first phase (the phase in which the source node sends the broadcast packet to the destination node) is used as an example. In a process in which the source node (a storage node A) sends the broadcast packet to the destination node (a storage node H) to search for a MAC address of the storage node H, in addition to sending the broadcast packet along a path of the storage node A→the storage node D→the storage node H in the foregoing example, forwarding may also be performed along the following path:

(1) A first processor in the storage node A generates a broadcast packet, and sends the broadcast packet to a second processor in the storage node A. The second processor in the storage node A indicates a transceiver in the storage node A to send the broadcast packet through a specified port (for example, a port 2) of the storage node A, where the broadcast packet carries a source IP address (an IP address of the storage node A), a source MAC address (a MAC address of the storage node A), a destination IP address (an IP address of the storage node H), and a quantity of forwarding times, and an initial value of the quantity of forwarding times is 0. The IP address of the storage node H may be entered by a user voluntarily. This is not specifically limited in embodiments of the present disclosure.

(2) A transceiver of a storage node D receives, through a port 1 of the storage node D, the broadcast packet sent by the storage node A, and sends the broadcast packet to a second processor of the storage node D. When the second processor of the storage node D determines that a broadcast identifier in the broadcast packet is 1, the second processor of the storage node D modifies the quantity of forwarding times carried in the broadcast packet to 1. The second processor of the storage node D is configured to process a MAC address at a data link layer, and a first processor of the storage node D is configured to process an IP address at a network layer. Therefore, the second processor of the storage node D sends the broadcast packet to the first processor of the storage node D when the second processor of the storage node D finds no destination MAC address (the MAC address of the storage node H) in the broadcast packet. The first processor of the storage node D obtains the destination IP address (the IP address of the storage node H) from the broadcast packet, compares the destination IP address (the IP address of the storage node H) with an IP address of the storage node D to determine that the storage node D is not the destination node, and sends a determining result to the second processor of the storage node D. The second processor of the storage node D then determines that the quantity of forwarding times is not greater than a forwarding threshold 2. Therefore, the second processor of the storage node D associates the source MAC address (the MAC address of the storage node A) with the port 1 of the storage node D as an entry and stores the entry in a second memory of the storage node D. The transceiver of the storage node D sends the broadcast packet through all other ports of the storage node D than the port 1 of the storage node D.

(3) A transceiver of a storage node B receives, through a port 2 of the storage node B, the broadcast packet sent by the storage node D, and sends the broadcast packet to a second processor of the storage node B. When the second processor of the storage node B determines that the broadcast identifier in the broadcast packet is 1, the second processor of the storage node B modifies the quantity of forwarding times carried in the broadcast packet to 2. The second processor of the storage node B is configured to process a MAC address at the data link layer, and a first processor of the storage node B is configured to process an IP address at the network layer. Therefore, the second processor of the storage node B sends the broadcast packet to the first processor of the storage node B when the second processor of the storage node B finds no destination MAC address (the MAC address of the storage node H) in the broadcast packet. The first processor of the storage node B obtains the destination IP address (the IP address of the storage node H) from the broadcast packet, compares the destination IP address (the IP address of the storage node H) with an IP address of the storage node B to determine that the storage node B is not the destination node, and sends a determining result to the second processor of the storage node B. The second processor of the storage node B then determines that the quantity of forwarding times is not greater than the forwarding threshold 2. Therefore, the second processor of the storage node B associates the source MAC address (the MAC address of the storage node A) with the port 2 of the storage node B as an entry and stores the entry in a second memory of the storage node B. The transceiver of the storage node B sends the broadcast packet through all other ports of the storage node B than the port 2 of the storage node B.

(4) A transceiver of the storage node E receives, through a port 2 of the storage node E, the broadcast packet sent by the storage node B, and sends the broadcast packet to a second processor of the storage node E. When the second processor of the storage node E determines that the broadcast identifier in the broadcast packet is 1, the second processor of the storage node E modifies the quantity of forwarding times carried in the broadcast packet to 3. Apparently, the quantity of forwarding times is greater than the forwarding threshold. Therefore, the second processor of the storage node E discards the broadcast packet.

It can be understood that, if the foregoing traffic loop avoidance mechanism is not added in the first phase, the broadcast packet of the storage node A may infinitely circulate in switching-free networking in a manner of the storage node A→the storage node D→the storage node B→the storage node E→a storage node G→the storage node D→the storage node B, . . . ; but after the foregoing traffic loop avoidance mechanism is added, the broadcast packet broadcast by the storage node A is discarded when forwarded to the storage node E, and does not infinitely circulate in the switch-free networking, thereby avoiding consumption of resources of the switch-free networking, to improve efficiency of the switch-free networking.

2. The forwarding node determines that a quantity of forwarding times of a response packet is greater than the forwarding threshold, and discards the response packet.

Second phase: a phase in which the destination node returns a response packet to the source node. The foregoing example of combining the traffic loop avoidance mechanism in the second phase (the phase in which the destination node sends the response packet to the source node) is used as an example. In a normal state, the response packet in the foregoing example should be returned along a path of the storage node H→the storage node D→the storage node A. However, when the response packet is attacked by a virus, the response packet may also be transmitted along the following path:

When the storage node H needs to return a response packet to the storage node A, a first processor of the storage node H queries a first memory to obtain the IP address of the storage node A and the MAC address of the storage node A, and generates a response packet of the broadcast packet. The response packet includes a destination MAC address (the MAC address of the storage node A), a destination IP address (the IP address of the storage node A), a source MAC address (the MAC address of the storage node H), and a quantity of forwarding times, and an initial value of the quantity of forwarding times is 0. However, when the response packet is attacked by a virus, the destination MAC address (the MAC address of the storage node A) in the response packet may be modified to a nonexistent MAC address, and the destination IP address (the IP address of the storage node A) in the response packet may be modified to a nonexistent IP address. The first processor of the storage node H sends the modified response packet to a second processor of the storage node H, and the second processor of the storage node H still indicates, based on a preconfigured routing configuration policy, the second processor of the storage node H to send the response packet through a port 2 of a transceiver of the storage node H.

The transceiver of the storage node D receives, through the port 4 of the storage D, the modified response packet sent by the storage node H, and sends the modified response packet to the second processor of the storage node D. When the second processor of the storage node D determines that a response identifier in the modified response packet is 1, the second processor of the storage node D sets the quantity of forwarding times in the modified response packet to 1. The second processor of the storage node D is configured to process the MAC address at the data link layer, and the first processor of the storage node D is configured to process the IP address at the network layer. Therefore, when the second processor of the storage node D finds the destination MAC address (the nonexistent MAC address) in the modified response packet, the second processor of the storage node D obtains the destination MAC address (the nonexistent MAC address) from the modified response packet, and compares the destination MAC address (the nonexistent MAC address) with a MAC address of the storage node D to determine that the modified response packet needs to be forwarded. The second processor of the storage node D then determines that the quantity of forwarding times is not greater than the forwarding threshold, and searches the second memory of the storage node D for an entry. Because no corresponding entry is found, the second processor of the storage node D indicates the transceiver to send the modified response packet through a port (for example, a port 2) other than a receive port (the port 4).

The transceiver of the storage node B receives, through the port 2 of the storage node B, the modified response packet sent by the storage node D, and sends the modified response packet to the second processor of the storage node B. When the second processor of the storage node B determines that the response identifier in the modified response packet is 1, the second processor of the storage node B sets the quantity of forwarding times in the modified response packet to 2. The second processor of the storage node B is configured to process the MAC address at the data link layer, and the first processor of the storage node B is configured to process the IP address at the network layer. Therefore, when the second processor of the storage node B finds the destination MAC address (the nonexistent MAC address) in the modified response packet, the second processor of the storage node B obtains the destination MAC address (the nonexistent MAC address) from the modified response packet, and compares the destination MAC address (the nonexistent MAC address) with a MAC address of the storage node B to determine that the modified response packet needs to be forwarded. The second processor of the storage node B then determines that the quantity of forwarding times is not greater than the forwarding threshold, and therefore searches the second memory of the storage node B for an entry. Because no corresponding entry is found, the second processor of the storage node B indicates the transceiver to send the modified response packet through a port (for example, a port 3) other than a receive port (the port 2).

The transceiver of the storage node E receives, through the port 2 of the storage node E, the modified response packet sent by the storage node B, and sends the modified response packet to the second processor of the storage node E. When the second processor of the storage node E determines that the response identifier in the modified response packet is 1, the second processor of the storage node E sets the quantity of forwarding times in the modified response packet to 3. The second processor of the storage node E discards the modified response packet because the quantity of forwarding times is greater than the forwarding threshold.

It can be understood that if the foregoing traffic loop avoidance mechanism is not added in the second phase, the modified response packet may infinitely circulate in the switching-free networking in a manner of the storage node H→the storage node D→the storage node B→the storage node E→the storage node G→the storage node D→the storage node B, . . . ; but after the foregoing traffic loop avoidance mechanism is added, the modified response packet is discarded when forwarded to the storage node E, and does not infinitely circulate in the switching-free networking, thereby avoiding consumption of resources of the switching-free networking, to improve efficiency of the switching-free networking.

3. The forwarding node determines that a quantity of forwarding times of a data packet is greater than the forwarding threshold, and discards the data packet.

Third phase: a phase in which the source node sends a data packet to the destination node. The foregoing example of combining the traffic loop avoidance mechanism in the third phase is used as an example. In a normal state, the data packet in the foregoing example should be sent to the storage node H based on the path of the storage node A→the storage node D→the storage node H. However, when the data packet is attacked by a virus, the data packet may also be transmitted along the following path:

The first processor in the storage node A generates a data packet, and sends the data packet to the second processor in the storage node A. The data packet carries a source IP address (the IP address of the storage node A), a source MAC address (the MAC address of the storage node A), a destination IP address (the IP address of the storage node H), a destination MAC address (the storage node H), and a quantity of forwarding times, and an initial value of the quantity of forwarding times is 0. The IP address of the storage node H may be entered by a user voluntarily. This is not specifically limited in embodiments of the present disclosure. When the data packet is attacked by a virus, and the destination IP address (the IP address of the storage node H) in the data packet is modified to a nonexistent IP address, the destination MAC address (the MAC address of the storage node H) in the data packet is modified to a nonexistent MAC address. The second processor in the storage node A indicates, based on a preconfigured routing configuration policy, the transceiver in the storage node A to send the modified data packet through the port 2 of the storage node A.

(2) The transceiver of the storage node D receives, through the port 1 of the storage node D, the modified data packet sent by the storage node A, and sends the modified data packet to the second processor of the storage node D. When the second processor of the storage node D determines that a data identifier in the modified data packet is 1, the second processor of the storage node D modifies the quantity of forwarding times carried in the modified data packet to 1. The second processor of the storage node D is configured to process the MAC address at the data link layer, and the first processor of the storage node D is configured to process the IP address at the network layer. Therefore, the second processor of the storage node D searches the second memory of the storage node D for an entry when the second processor of the storage node D finds the destination MAC address (the nonexistent MAC address) in the modified data packet. Because no corresponding entry is found, the second processor of the storage node D indicates the transceiver to send the modified data packet through a port (for example, the port 2) other than a receive port.

(3) The transceiver of the storage node B receives, through the port 2 of the storage node B, the modified data packet sent by the storage node D, and sends the modified data packet to the second processor of the storage node B. When the second processor of the storage node B determines that the data identifier in the modified data packet is 1, the second processor of the storage node B modifies the quantity of forwarding times carried in the data packet to 2. The second processor of the storage node B is configured to process the MAC address at the data link layer, and the first processor of the storage node B is configured to process the IP address at the network layer. Therefore, the second processor of the storage node B searches the second memory of the storage node B for an entry when the second processor of the storage node B finds the destination MAC address (the nonexistent MAC address) in the modified data packet. Because no corresponding entry is found, the second processor of the storage node B indicates the transceiver to send the modified data packet through a port (for example, the port 3) other than a receive port.

(4) The transceiver of the storage node E receives, through the port 2 of the storage node E, the modified data packet sent by the storage node B, and sends the modified data packet to the second processor of the storage node E. When the second processor of the storage node E determines that the data identifier in the modified data packet is 1, the second processor of the storage node E modifies the quantity of forwarding times carried in the modified data packet to 3. Apparently, the quantity of forwarding times is greater than the forwarding threshold. Therefore, the second processor of the storage node E discards the modified data packet.

It can be understood that if the foregoing traffic loop avoidance mechanism is not added in the third phase, the modified data packet may infinitely circulate in the switching-free networking in a manner of the storage node A→the storage node D→the storage node B→the storage node E→the storage node G→the storage node D→the storage node B, . . . ; but after the foregoing traffic loop avoidance mechanism is added, the modified data packet is discarded when forwarded to the storage node B, and does not infinitely circulate in the switching-free networking, thereby avoiding consumption of resources of the switching-free networking, to improve efficiency of the switching-free networking.

In each of the foregoing examples, the forwarding threshold may be determined based on a network topology diagram of the switch-free networking. For example, in a network topology structure of the switch-free networking shown in FIG. 4, data communication may be implemented between storage nodes via a maximum of two hops. Therefore, the forwarding threshold may be set to 2. It can be understood that the setting a value of the forwarding threshold is merely used as an example. In another example implementation, the value may be 3, 4, 5, or more. In addition, the forwarding threshold may be set based on the network topology structure, and may also be set based on factors such as a network forwarding delay and link quality such as a packet loss rate. This is not specifically limited in embodiments of the present disclosure.

In each of the foregoing examples, the quantity of forwarding times may be carried in a tag protocol identifier (TCI) field of a packet. Because structures of the three types of packets: the broadcast packet, the response packet, and the data packet in this disclosure are basically the same, the following uses the broadcast packet as an example for description.

Figures 6, 7:
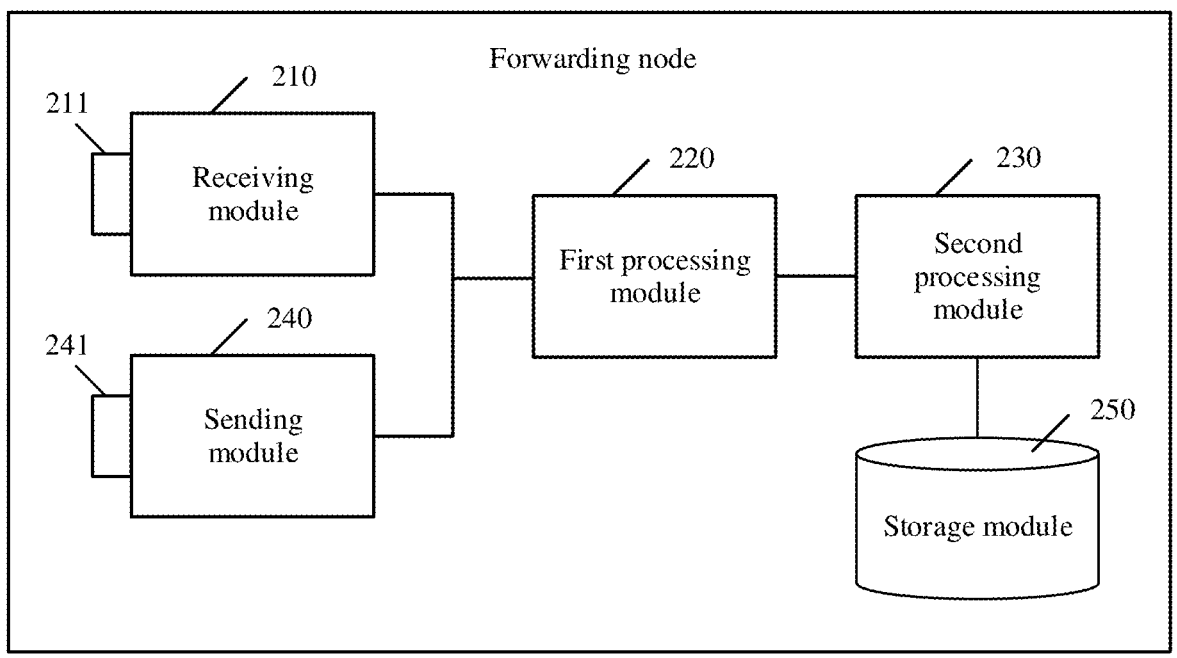
FIG. 6 is a schematic structural diagram of a broadcast packet according to an embodiment of this disclosure.
FIG. 7 is a schematic structural diagram of a forwarding node according to an embodiment of this disclosure.

As shown in FIG. 6, the broadcast packet usually includes a 6-byte destination MAC address field, a 6-byte source MAC address field, a 2-byte tag protocol identifier (TPID), a 2-byte TCI field, a 2-byte type field, a 46-byte to 1500-byte payload byte, and a 4-byte cyclic redundancy check (CRC). The TCI field may include a 3-bit user priority byte, a 1-bit canonical format indicator (CFI), and a 12-bit virtual local area network identifier (VLAN ID) field.

In an embodiment, a high-order bit of a virtual local area network identifier may be used to carry the quantity of forwarding times, and a low-order bit may be used to carry a VLAN ID. For example, a highest-order bit of the virtual local area network identifier may be used to identify and carry the quantity of forwarding times, and other 11 low-order bits may be used to carry the VLAN ID. Alternatively, a low-order bit of a virtual local area network identifier may be used to carry the quantity of forwarding times, and a high-order bit may be used to carry a VLAN ID. For example, a lowest-order bit of the virtual local area network identifier may be used to identify and carry the quantity of forwarding times, and other 11 high-order bits may be used to carry the VLAN ID.

In addition, the broadcast identifier may be further carried in a reserved field (not shown in the figure) of the broadcast packet. Certainly, the broadcast identifier may also be explicitly or implicitly carried in an existing field of the broadcast packet. This is not limited in embodiments of the present disclosure. The response packet and the data packet may also respectively carry the response identifier and the data identifier.

It can be understood that in the foregoing example, only a single bit is used to carry the quantity of forwarding times. In actual application, more bits may also be used to carry the quantity of forwarding times. This is not limited in embodiments of the present disclosure. In addition, in the foregoing example, description is provided by using an example in which the virtual local area network identifier field includes 12 bits. In actual application, the virtual local area network identifier field may include fewer or more bits. This is not limited in embodiments of the present disclosure.

Referring to FIG. 7, FIG. 7 is a schematic structural diagram of a forwarding node based on this disclosure. The forwarding node directly forwards a packet or data sent by another node by using a network. To be specific, the forwarding node receives data by using the first node or the second node, and stores the received data in the first memory. None of the forwarding node, the first node, and the second node are switches. The network does not need to forward the data and packet by using a switch. In an example embodiment, the first node, the forwarding node, and the second node each are storage nodes in FIG. 4, the storage node is configured to store an electronic file, and the electronic file includes one or more of a text, an image, an audio, and a video. In a more specific embodiment, the first node may be a source node, and the second node may be a destination node.

The forwarding node and the other nodes are all nodes in switch-free networking. The switch-free networking is a decentralized networking manner. To be specific, each node in the switch-free networking has an equal status, or the switch-free networking does not include a forwarding center (for example, a switch), and each node in the networking needs to assume a data forwarding function in addition to assuming its own function (for example, a data storage function). In a feasible embodiment, the forwarding node may be a storage node in FIG. 4, for example, the storage node D in the first manner to the third manner of combining the traffic loop avoidance mechanism on the basis of the path self-learning mechanism and a combination thereof. This is not limited in embodiments of the present disclosure. As shown in FIG. 7, the forwarding node in this disclosure includes a receiving module 210, a first processing module 220, a second processing module 230, a sending module 240, and a storage module 250. The receiving module 210 includes a first port 211, and the sending module 240 includes a second port 241.

The receiving module 210 is configured to receive a broadcast packet through the first port 211, where the broadcast packet carries first address information of a source node, and the broadcast packet is a packet sent by the source node to query second address information of a destination node.

The second processing module 230 is configured to store a first entry in the storage module 250, where the first entry is used to record a correspondence between the first address information and the first port 211.

The sending module 240 is configured to send the broadcast packet through the second port 241.

The receiving module 210 is configured to receive a response packet of the broadcast packet through the second port 241, where the response packet carries the second address information, and the response packet is used to return the second address information to the source node.

The second processing module 230 is configured to query the first entry based on the first address information to determine the first port 211.

The sending module 240 is configured to send the response packet through the first port 211.

The second processing module 230 is configured to store a second entry in the storage module 250, where the second entry is used to record a correspondence between the second address information and the second port 241.

The first processing module 220 may be a processor with a relatively fast processing speed and a relatively strong operation capability, for example, the first processor in FIG. 2.

The second processing module 230 may be a processor with a relatively slow processing speed and a relatively weak operation capability, for example, the second processor in FIG. 2.

The receiving module 210 and the sending module 240 may be disposed separately, or may be integrated together. This is not limited in embodiments of the present disclosure. When the two are integrated together, the two may be the transceiver in FIG. 2.

After learning the correspondence between the second address information and the second port 241 by using the broadcast packet and the response packet, the forwarding node may forward a data packet based on the correspondence between the second address information and the second port 241. The data packet carries the second address information. For example, the receiving module 210 is configured to receive the data packet, where the data packet is used to carry data sent by the source node to the destination node and the second address information; the second processing module 230 is configured to query the second entry based on the second address information to obtain the second port 241; and the sending module 240 is configured to send the data packet through the second port 241.

To avoid formation of a traffic loop, the forwarding node may further combine a traffic loop avoidance mechanism in one or more of processes of sending the broadcast packet, receiving the response packet, and sending the data packet, to be specific, forward the broadcast packet, the received response packet, and the sent data packet only when a quantity of forwarding times of the broadcast packet, that of the received response packet, and that of the sent data packet are not greater than a forwarding threshold; or discard the broadcast packet, the received response packet, and the sent data packet if the quantity of forwarding times is greater than the forwarding threshold. The forwarding threshold is determined based on a topology structure of a network in which the forwarding node is located. For example, the broadcast packet further includes a first quantity of forwarding times, and the sending module 240 is further configured to: when determining that the first quantity of forwarding times is greater than the forwarding threshold, discard the broadcast packet; and when determining that the first quantity of forwarding times is not greater than the forwarding threshold, increase the first quantity of forwarding times by one, and send the broadcast packet through the second port;

the response packet further includes a second quantity of forwarding times, and the sending module 240 is further configured to: when determining that the second quantity of forwarding times is greater than the forwarding threshold, discard the response packet; and when determining that the second quantity of forwarding times is not greater than the forwarding threshold, increase the second quantity of forwarding times by one, and send the response packet through the first port; or the data packet further includes a third quantity of forwarding times, and the sending module 240 is further configured to: when determining that the third quantity of forwarding times is greater than the forwarding threshold, discard the data packet; and when determining that the third quantity of forwarding times is not greater than the forwarding threshold, increase the third quantity of forwarding times by one, and send the data packet through the second port.

For simplicity, the forwarding node shown in FIG. 7 is not described herein in detail. For details, refer to the first manner to the third manner of combining the traffic loop avoidance mechanism on the basis of the path self-learning mechanism and the combination thereof.

Figure 8:
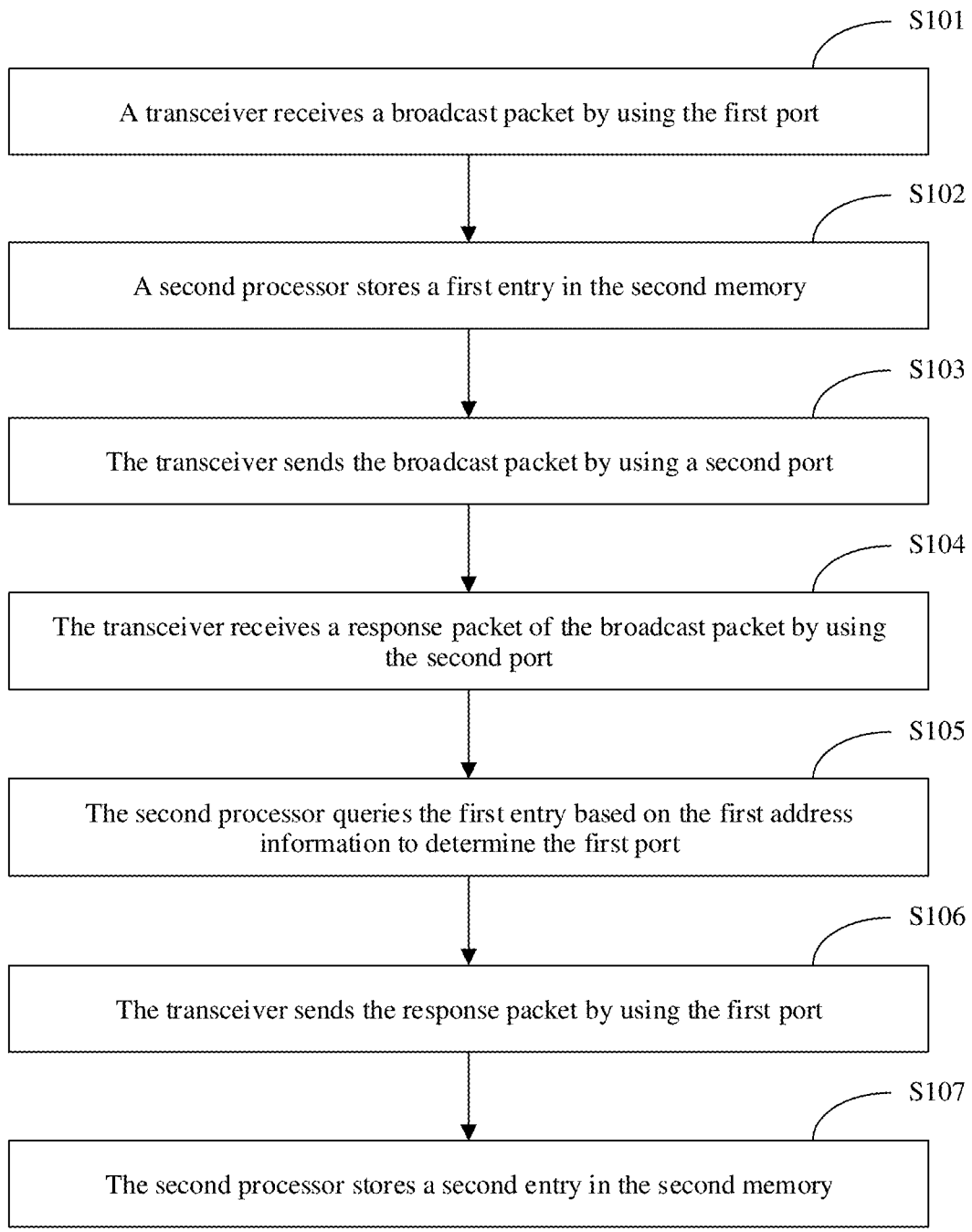
FIG. 8 is a schematic flowchart of a data or packet forwarding method according to an embodiment of this disclosure.

Referring to FIG. 8, FIG. 8 is a schematic flowchart of a data or packet forwarding method according to this disclosure. The forwarding node directly forwards a packet or data sent by another node by using a network. The forwarding node includes a first processor, a first memory, and a network adapter, the network adapter includes a second processor, a second memory, and a transceiver, and the transceiver includes a first port and a second port. The data or packet forwarding method in this disclosure includes the following steps:

S101: The transceiver receives a broadcast packet through the first port, where the broadcast packet carries first address information of a source node, and the broadcast packet is a packet sent by the source node to query second address information of a destination node.

S102: The second processor stores a first entry in the second memory, where the first entry is used to record a correspondence between the first address information and the first port.

S103: The transceiver sends the broadcast packet through the second port.

S104: The transceiver receives a response packet of the broadcast packet through the second port, where the response packet carries the second address information, and the response packet is used to return the second address information to the source node.

S105: The second processor queries the first entry based on the first address information to determine the first port.

S106: The transceiver sends the response packet through the first port.

S107: The second processor stores a second entry in the second memory, where the second entry is used to record a correspondence between the second address information and the second port.

In this embodiment, the first address information of the source node may be MAC address information of the source node, and the second address information of the destination node may be MAC address information of the destination node. This is not limited in embodiments of the present disclosure. FIG. 4 is used as an example. It is assumed that the source node is the storage node A, the destination node is the storage node H, and the forwarding node is the storage node D, the first address information of the source node is a MAC address of the storage node A, the second address information of the destination node is MAC address information of the storage node H, the first port is the port 2 of the storage node D, and the second port is the port 4 of the storage node D.

For simplicity, the data or packet forwarding method shown in FIG. 8 is not described herein in detail. For details, refer to the first manner to the third manner of combining the traffic loop avoidance mechanism on the basis of the path self-learning mechanism and a combination thereof.

This disclosure provides an information processing system. The information processing system in this disclosure includes: directly forwarding, by the forwarding node, a packet or data sent by another node by using a network. To be specific, the forwarding node receives the broadcast packet by using a first node, and sends the broadcast packet to a second node, where the first node includes a third processor and a third memory, and the second node includes a fourth processor and a fourth memory; and the third memory and the fourth memory are configured to store data forwarded or sent by using the forwarding node. More specifically, the forwarding node receives data by using the first node or the second node, and stores the received data in the first memory. The forwarding node and the first node are connected by using a communication network, and the forwarding node and the second node are also connected by using a communication network. The communication network may be a fibre channel (FC) network, or the like.

In an example embodiment, the information processing system may be an information processing system constituted of a networking-free network shown in FIG. 4. The first node may be the storage node A in FIG. 4, the forwarding node may be the storage node D in FIG. 4, and the second node may be the storage node H in FIG. 4. In addition, the forwarding node may use a structure of the storage node shown in FIG. 2, and the forwarding node may perform the steps performed by the storage node D in the first manner to the third manner of combining the traffic loop avoidance mechanism on the basis of the path self-learning mechanism and a combination thereof.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a storage disk, or a magnetic tape), an optical medium (for example, a DVD), a semiconductor medium (for example, a solid-state drive (SSD)), or the like.

What is claimed is:

1. A forwarding node, comprising a network adapter, wherein the network adapter comprises a network adapter memory, a plurality of ports, and at least one processor coupled to the network adapter memory and configured to:
receive a broadcast packet from a first node through a first port in the plurality of the ports of the forwarding node for querying a Medium Access Control (MAC) address of a second node, wherein the broadcast packet includes a MAC address of the first node and an Internet Protocol (IP) address of the second node;
compare the IP address of the second node carried in the broadcast packet with an IP address of the forwarding node to determine whether the forwarding node is a destination node; and
upon determining that the forwarding node is not the destination node, perform operations comprising:
recording a first correspondence between the first port of the forwarding node and the MAC address of the first node in the network adapter memory,
forwarding the broadcast packet through one or more ports in the plurality of ports other than the first port,
receiving a response packet of the broadcast packet through a second port in the plurality of the ports, wherein the response packet includes the MAC address of the second node and the MAC address of the first node, and
forwarding the response packet through the first port determined based on the first correspondence; and
when the IP address of the forwarding node is carried in the broadcast packet, store a correspondence between the MAC address of the first node and an IP address of the first node in the network adapter memory,
wherein the response packet further includes a response identifier indicating whether the forwarding node needs to determine whether a quantity of forwarding times of the response packet needs to be greater than a forwarding threshold.

2. The forwarding node according to claim 1, wherein the at least one processor is further configured to:
record a second correspondence between the second port and the MAC address of the second node in the network adapter memory.

3. The forwarding node according to claim 2, wherein the at least one processor is further configured to:
receive a data packet from the first node, wherein the data packet includes data and the MAC address of the second node; and
forward the data packet through the second port according to the second correspondence.

4. The forwarding node according to claim 3, wherein the data packet further comprises a third quantity of forwarding times, the at least one processor is further configured to:
determine whether the third quantity of forwarding times is greater than a forwarding threshold;
discard the data packet upon determination that the third quantity of forwarding times is greater than the forwarding threshold; and
upon determination that the third quantity of forwarding times is not greater than the forwarding threshold, increase the third quantity of forwarding times by one, and forward the data packet through the second port.

5. The forwarding node according to claim 4, wherein the forwarding threshold is determined based on a topology structure of a network in which the forwarding node is located.

6. The forwarding node according to claim 1, wherein the broadcast packet further comprises a first quantity of forwarding times, the at least one processor is further configured to:
determine whether the first quantity of forwarding times is greater than a forwarding threshold;
discard the broadcast packet upon determination that the first quantity of forwarding times is greater than the forwarding threshold; and
upon determination that the first quantity of forwarding times is not greater than the forwarding threshold, increase the first quantity of forwarding times by one, and forward the broadcast packet through one or more ports in the plurality of ports other than the first port.

7. The forwarding node according to claim 1, wherein the response packet further comprises a second quantity of forwarding times, the at least one processor is further configured to:
determine whether the second quantity of forwarding times is greater than a forwarding threshold;
discard the response packet upon determination that the second quantity of forwarding times is greater than the forwarding threshold; and
upon determination that the second quantity of forwarding times is not greater than the forwarding threshold, increase the second quantity of forwarding times by one, and forward the response packet through the first port.

8. The forwarding node according to claim 1, wherein the first node is a source node, and the second node is a destination node.

9. The forwarding node according to claim 8, wherein the at least one processor is further configured to query the first correspondence based on the MAC address of the first node in the network adapter memory to determine the first port of the forwarding node.

10. The forwarding node according to claim 8, wherein the at least one processor is further configured to:
record a second correspondence between the second port and the MAC address of the second node in the network adapter memory,
query the second correspondence based on the MAC address of the second node in the network adapter memory to determine the second port, and
forward a data packet received from the first node via the second port determined based on the second correspondence.

11. A forwarding method performed by a forwarding node including a network adapter, wherein the network adapter includes a network adapter memory, a plurality of ports, and at least one processor; wherein the method comprises:
receiving, by the at least one processor, a broadcast packet from a first node through a first port in the plurality of the ports for querying a Medium Access Control (MAC) address of a second node, wherein the broadcast packet includes a MAC address of the first node and an Internet Protocol (IP) address of the second node;
comparing the IP address of the second node carried in the broadcast packet with an IP address of the forwarding node to determine whether the forwarding node is a destination node; and
upon determining that the forwarding node is not the destination node, performing operations comprising:
recording, by the at least one processor, a first correspondence between the first port and the MAC address of the first node in the network adapter memory,
forwarding, by the at least one processor, the broadcast packet through one or more ports in the plurality of ports other than the first port,
receiving, by the at least one processor, a response packet of the broadcast packet through a second port in the plurality of the ports, wherein the response packet includes the MAC address of the second node and the MAC address of the first node, and
forwarding, by the at least one processor, the response packet through the first port determined based on the first correspondence; and
when the IP address of the forwarding node is carried in the broadcast packet, storing a correspondence between the MAC address of the first node and an IP address of the first node in the network adapter memory,
wherein the response packet further includes a response identifier indicating whether the forwarding node needs to determine whether a quantity of forwarding times of the response packet needs to be greater than a forwarding threshold.

12. The method according to claim 11, further comprising:
recording, by the at least one processor, a second correspondence between the second port and the MAC address of the second node in the network adapter memory.

13. The method according to claim 12, further comprising:
receiving, by the at least one processor, a data packet from the first node, wherein the data packet includes data and the MAC address of the second node; and
forwarding, by the at least one processor, the data packet through the second port according to the second correspondence.

14. The method according to claim 13, wherein the data packet further comprises a third quantity of forwarding times, and the method further comprises:

- determining whether the third quantity of forwarding times is greater than a forwarding threshold;
- discarding, by the at least one processor, the data packet upon determination that the third quantity of forwarding times is greater than the forwarding threshold; and
- upon determination that the third quantity of forwarding times is not greater than the forwarding threshold, increasing, by the at least one processor, the third quantity of forwarding times by one, and forwarding the data packet through the second port.

15. The method according to claim 14, wherein the forwarding threshold is determined based on a topology structure of a network in which the forwarding node is located.

16. The method according to claim 11, wherein the broadcast packet further comprises a first quantity of forwarding times, and the method further comprises:

- determining whether the first quantity of forwarding times is greater than a forwarding threshold;
- discarding, by the at least one processor, the broadcast packet upon determination that the first quantity of forwarding times is greater than the forwarding threshold; and
- upon determination that the first quantity of forwarding times is not greater than the forwarding threshold, increasing, by the at least one processor, the first quantity of forwarding times by one, and forwarding the broadcast packet through one or more ports in the plurality of ports other than the first port.

17. The method according to claim 11, wherein the response packet further comprises a second quantity of forwarding times, and the method further comprises:

- determining whether the second quantity of forwarding times is greater than a forwarding threshold;
- discarding, by the at least one processor, the response packet upon determination that the second quantity of forwarding times is greater than the forwarding threshold; and
- upon determination that the second quantity of forwarding times is not greater than the forwarding threshold, increasing, by the at least one processor, the second quantity of forwarding times by one, and forwarding the response packet through the first port.

* * * * *